US012668462B2

(12) United States Patent
Kundel, Sr. et al.

(10) Patent No.: US 12,668,462 B2
(45) Date of Patent: Jun. 30, 2026

(54) METHOD AND APPARATUS FOR OPERATING A CRANE

(71) Applicant: Kundel Industries, Inc., Vienna, OH (US)

(72) Inventors: Robert Kundel, Sr., Cortland, OH (US); Richard A. Schley, Warren, OH (US); Andrew A. Pirigyi, Warren, OH (US)

(73) Assignee: Kundel Industries, Inc., Vienna, OH (US)

( * ) Notice: Subject to any disclaimer, the term of this patent is extended or adjusted under 35 U.S.C. 154(b) by 796 days.

(21) Appl. No.: 18/060,028

(22) Filed: Nov. 30, 2022

(65) Prior Publication Data

US 2023/0264929 A1 Aug. 24, 2023

Related U.S. Application Data

(60) Provisional application No. 63/312,140, filed on Feb. 21, 2022.

(51) Int. Cl.
*B66C 23/16* (2006.01)
*B66C 23/06* (2006.01)
*B66C 23/62* (2006.01)

(52) U.S. Cl.
CPC .............. *B66C 23/16* (2013.01); *B66C 23/06* (2013.01); *B66C 23/62* (2013.01)

(58) Field of Classification Search
CPC ........ B66C 23/16; B66C 23/62; B66C 23/163; B66C 23/84; B63B 32/20
USPC .......................................................... 114/373
See application file for complete search history.

(56) References Cited

U.S. PATENT DOCUMENTS 4,400,042 A 8/1983 Fritz
5,834,662 A * 11/1998 Stoll ........................ B66C 23/84 74/411
6,715,569 B1 * 4/2004 Rogers .................... B66C 23/16 175/85

(Continued)

FOREIGN PATENT DOCUMENTS

CN 202091356 12/2011
CN 103030076 4/2013

(Continued)

OTHER PUBLICATIONS

CN-108689309-A Machine Translation (Year: 2018).*

(Continued)

*Primary Examiner* — Marc Q Jimenez
*Assistant Examiner* — Eric Anthony Starck
(74) *Attorney, Agent, or Firm* — Sand, Sebolt & Wernow Co., LPA

(57) ABSTRACT

A davit crane that includes a base adapted to operably engage with a ground surface. The davit crane also includes a drive assembly operably engaged with the base. The davit crane also includes an actuation assembly operably engaged with the drive assembly, wherein the actuation assembly is configured to move between a lowered position and a raised position via the drive assembly. The davit crane also includes a boom assembly operably engaged with the actuation assembly. The actuation assembly of the davit crane is operable to pivotably adjust the boom assembly between the raised position and the lowered position.

18 Claims, 11 Drawing Sheets

(56) References Cited

U.S. PATENT DOCUMENTS

| | | | | |
|---|---|---|---|---|
| 7,080,823 | B1 | 7/2006 | Triplett | |
| 7,478,948 | B2 | 1/2009 | Noda | |
| 8,844,738 | B2 | 9/2014 | Thompson | |
| 8,967,371 | B2 | 3/2015 | Dunn | |
| 9,630,816 | B1 * | 4/2017 | Napieralski | B66C 19/02 |
| 10,794,422 | B1 | 10/2020 | Galehouse | |
| 2013/0202234 | A1 | 8/2013 | Noda et al. | |
| 2021/0053801 | A1 | 2/2021 | Schrank et al. | |

FOREIGN PATENT DOCUMENTS

| | | | | | |
|---|---|---|---|---|---|
| CN | 203558799 | U | * | 4/2014 | |
| CN | 108223566 | | | 6/2018 | |
| CN | 108249321 | A | * | 7/2018 | B66C 23/88 |
| CN | 108689309 | A | * | 10/2018 | B66C 23/04 |
| CN | 111302234 | A | * | 6/2020 | B66C 23/06 |
| DE | 102014015363 | | | 4/2016 | |
| EP | 1519058 | | | 9/2004 | |
| EP | 1760339 | | | 3/2007 | |
| EP | 2913544 | | | 9/2015 | |
| GB | 743929 | | | 1/1956 | |
| JP | 2013011291 | | | 1/2013 | |

OTHER PUBLICATIONS

CN-111302234-A Machine Translation (Year: 2020).*

CN-108249321-A Machine Translation (Year: 2018).*

CN-203558799-U Machine Translation (Year: 2014).*

Liebherr; "Slewing Bearings by Liebherr"; product portfolio; accessed Jun. 16, 2021; Liebherr USA, CO; Saline, MI, USA.

Liebherr; "Slewing Bearings"; product catalog; accessed Jun. 16, 2021; Liebherr USA, CP; Saline, MI, USA.

Dayananda Raju; "The World of Turbine Bearings"; Wind Systems Magazine; Apr. 15, 2018; URL https://www.windsystemsmag.com/the-world-of-turbine-bearings/ accessed Jun. 16, 2021; Pelham, AL, USA.

* cited by examiner

METHOD AND APPARATUS FOR OPERATING A CRANE

REFERENCE TO RELATED APPLICATIONS

This application claims the benefit of U.S. Provisional Application Ser. No. 63/312,140, filed on Feb. 21, 2022; the disclosure of which is incorporated herein by reference.

TECHNICAL FIELD

This present disclosure is generally directed to lifting devices. More particularly, this present disclosure is directed to davit cranes. Specifically, this present disclosure is directed towards davit cranes having an actuation assembly that linearly moves upwardly and downwardly for pivoting a boom arm and a slew bearing that rotatably moves the boom arm.

BACKGROUND OF THE INVENTION

Davit cranes and similar cranes are used in various industries for supporting, raising, and lowering equipment or objects. Generally, these davit cranes are used in various work areas for repetitive and unique lifting tasks based on the industry. These davit cranes also provide portable, overhead lifting characteristics for maneuvering equipment and objects at various locations desired by the operators of these davit cranes. However, these davit cranes must raise and lower various types of equipment and objects at varying weights at various heights.

To combat these issues, conventional davit cranes use pulley systems for raising and lowering various types of equipment. However, these pulley systems may incur high amount of tension stress during repetitive use of pulling and lifting objects of varying weights; as such, the cables provided in these pulley systems may fray at an increase rate depending on the use and function of these cables. Other davit cranes currently available use pneumatic or hydraulic systems for raising and lowering various types of equipment. However, these use pneumatic or hydraulic systems may also require additional components and device in order for the davit crane to function (i.e., air compressor, hydraulic components, etc.).

SUMMARY OF THE INVENTION

The presently disclosed davit crane provides operators with the multifunctional use for lifting objects and rotating said lifted objects about the davit crane. The disclosed davit crane raises and lowers a boom arm of a boom assembly by linearly moving an actuation assembly upwardly and downwardly relative to a base of the davit crane. The davit crane also provides a slew bearing that rotatably moves the boom assembly about the base. As such, the davit crane disclosed herein addresses some of the inadequacies of previously known davit cranes and other similar types of cranes.

In one aspect, an exemplary embodiment of the present disclosure may provide a davit crane. The davit crane includes a base adapted to operably engage with a ground surface. The davit crane also includes a drive assembly operably engaged with the base. The davit crane also includes an actuation assembly operably engaged with the drive assembly, wherein the actuation assembly is configured to move between a lowered position and a raised position via the drive assembly. The davit crane also includes a boom assembly operably engaged with the actuation assembly. The actuation assembly is operable to pivotably adjust the boom assembly between the raised position and the lowered position.

This exemplary embodiment or another exemplary embodiment may further provide that the actuation assembly comprises: a support column; an actuating column operably engaged with the drive assembly and operably engaged inside of the support column; and wherein the actuating column is vertically moveable relative to the support column to pivot the boom assembly between the lowered position and the raised position. This exemplary embodiment or another exemplary embodiment may further provide that the actuation assembly further comprises: a jack screw operably engaged with the actuating column and operably engaged with the drive assembly; wherein the jack screw is configured to be longitudinally moveable inside of the support column and the base via the drive assembly; and wherein the jack screw and the actuating column are collectively vertically moveable relative to the support column to pivot the boom assembly between the lowered position and the raised position. This exemplary embodiment or another exemplary embodiment may further provide that the actuation assembly further comprises: a pivot column operably engaged with the actuating column and operably engaged with the boom assembly; wherein the pivot column enables the actuating column to pivotably adjust the boom assembly between the lowered position and the raised position. This exemplary embodiment or another exemplary embodiment may further provide that the boom assembly comprises: a boom arm configured to operably engaged with the actuation column of the actuation assembly; and at least one support arm operably engaged with the support column of the actuating assembly and operably engaged with the boom arm; wherein the boom arm and the at least one support arm are pivotable between the raised position and the lowered position. This exemplary embodiment or another exemplary embodiment may further provide that the boom assembly further comprises: a first height measured from the boom arm to the base when the boom arm is provided in the lowered position; and a second height measured from the boom arm to the base when the boom arm is provided in the raised position; wherein the second height is greater than the first height. This exemplary embodiment or another exemplary embodiment may further provide that the boom assembly further comprises: an extension member operably engaged with the boom arm and operably engaged with the actuating column; wherein the extension member positions the boom arm at a distance away from the actuating column; and wherein the extension member is operable to enable the actuation assembly and the drive assembly to pivotably move the boom arm between the lowered position and the raised position. This exemplary embodiment or another exemplary embodiment may further provide that the drive assembly comprises: a top plate operably engaged with the support column; a housing operably engaged with the top plate; and a gear system positioned inside of the housing and operably engaged with a fitting pipe; wherein the gear system is operable to longitudinally move the jack screw and the actuating column between the raised position and the lowered position. This exemplary embodiment or another exemplary embodiment may further provide that the gear system of the drive assembly comprises: an input drive shaft operably engaged with the housing; and a worm gear operably meshed with the input drive shaft inside of the housing and threadably engaged with the jack screw inside of the housing. This exemplary embodiment or another exemplary embodiment may further provide that the gear system of the drive assembly further comprises: a first rotational force applied by the input drive shaft on the worm gear to rotate the worm gear; and a second rotational force applied by the worm gear on the jack screw to rotate the jack screw to longitudinally move the jack screw towards and away from the base. This exemplary embodiment or another exemplary embodiment may further provide that the gear system of the drive assembly further comprises: a first tapered roller bearing operably engaged with the worm gear and positioned between the worm gear and the top plate; and a second tapered roller bearing operably engaged with the worm gear and positioned between the worm gear and a fitting pipe of the drive assembly; wherein the first tapered roller bearing is positioned vertically above the second tapered roller bearing inside of the housing. This exemplary embodiment or another exemplary embodiment may further provide that the base further comprises: a top end; a bottom end positioned opposite to the top end; and a longitudinal axis defined therebetween; and wherein the davit crane further comprises: a slew bearing operably engaged with the drive assembly and the base; wherein the slew bearing is configured to collectively rotate the actuation assembly, the boom assembly, and the drive assembly about the longitudinal axis of the base. This exemplary embodiment or another exemplary embodiment may further provide that the slew bearing comprises: an inner ring operably engaged with the drive assembly; a first outer ring operably engaged on the inner ring and operably engaged with the base; and a second outer ring operably engaged on the inner ring opposite to the first outer ring and operably engaged with the base; wherein the inner ring is configured to collectively rotate the actuation assembly, the boom assembly, and the drive assembly on the first outer ring and the second outer ring. This exemplary embodiment or another exemplary embodiment may further provide that the slew bearing further comprises: a collar extending outwardly from the inner ring; an upper raceway defined in the collar; and a lower raceway defined in the collar; wherein the upper raceway and the lower raceway oppose one another relative to the collar. This exemplary embodiment or another exemplary embodiment may further provide that the slew bearing further comprises: a first lip extending outwardly from the first outer ring; and a first interior raceway defined in the first lip; wherein the first interior raceway faces the upper raceway of the collar when the inner ring and the first outer ring are operably engaged with one another. This exemplary embodiment or another exemplary embodiment may further provide that the slew bearing further comprises: a second lip extending outwardly from the second outer ring; and a second interior raceway defined in the second lip; wherein the second interior raceway faces the lower raceway of the collar when the inner ring and the second outer ring are operably engaged with one another. This exemplary embodiment or another exemplary embodiment may further provide that the slew bearing further comprises: a first set of balls operably engaged with the upper raceway of the collar and the first interior raceway of the first lip when the inner ring and the first outer ring are operably engaged with one another; and a second set of balls operably engaged with the lower raceway of the collar and the second interior raceway of the second lip when the inner ring and the second outer ring are operably engaged with one another.

In another aspect, an exemplary embodiment of the present disclosure may provide a method of lifting an object with a davit crane. The method comprises steps of: engaging the object with a boom arm of a boom assembly of the davit crane; applying a first rotational force on a gear system of the drive assembly of the davit crane; applying a second rotational force, via the gear system, on an actuation assembly of the davit crane; vertically moving the actuation assembly from a lowered position to a raised position relative to a base of the davit crane; pivoting a first end of the boom arm of the boom assembly, via the actuation assembly, upwardly away from the base; and pivoting a second end of the boom arm of the boom assembly, via the actuation assembly, downwardly towards the base, wherein the second end of the boom arm opposes the first end of the boom arm.

This exemplary embodiment or another exemplary embodiment may further provide that the step of vertically moving the actuation assembly from a lowered position to a raised position relative to a base of the davit crane includes longitudinally moving a jack screw of the actuation assembly downwardly into the base via the gear system. This exemplary embodiment or another exemplary embodiment may further provide a step of rotating the boom assembly, via a slew bearing, about a longitudinal axis of the base relative to said base.

In another aspect, and exemplary embodiment of the present disclosure may provide a slew bearing. The slew bearing includes an inner ring. The slew bearing also includes a first outer ring positioned about a first portion of the inner ring. The slew bearing also includes a second outer ring operably engaged with the first outer ring, wherein the second outer ring is positioned about a second portion of the inner ring opposite to the first outer ring. The slew bearing also includes at least one set of ball operably engaged with the inner ring and one or both of the first outer ring and the second outer ring. The slew bearing also includes that the inner ring is configured to rotate about the first outer ring and the second outer ring.

This exemplary embodiment or another exemplary embodiment may further provide that the inner ring comprises: a first end; a second end opposite to the first end; a circumferential wall extending between the first end and the second end; and a collar extending radially outwardly away from the circumferential wall at a positon between the first end and the second end. This exemplary embodiment or another exemplary embodiment may further provide that the inner ring further comprises: an upper raceway defined in the collar that extends into the collar towards the second end; and a lower raceway defined in the collar that extends into the collar towards the first end; wherein the upper raceway and the lower raceway oppose one another relative to the collar. This exemplary embodiment or another exemplary embodiment may further provide that the first outer ring comprises: a first lip extending outwardly from the first outer ring; and a first interior raceway defined in the first lip; wherein the first interior raceway faces the upper raceway of the collar when the inner ring and the first outer ring operably engage with one another. This exemplary embodiment or another exemplary embodiment may further provide that the slew bearing further comprises: a second lip extending outwardly from the second outer ring; and a second interior raceway defined in the second lip; wherein the second interior raceway faces the lower raceway of the collar when the inner ring and the second outer ring operably engage with one another. This exemplary embodiment or another exemplary embodiment may further provide that the at least one set of balls operably engages with the upper raceway of the collar and the first interior raceway of the first lip when the inner ring and the first outer ring are operably engaged with one another. This exemplary embodiment or another exemplary embodiment may further provide that the at least one set of balls further comprises: a second set of balls operably engaged with the lower raceway of the collar and the second interior raceway of the second lip when the inner ring and the second outer ring are operably engaged with one another. This exemplary embodiment or another exemplary embodiment may further provide that the inner ring further comprises: a first opening defined at the first end of the inner ring; a second opening defined at the second end of the inner ring; and a passageway defined between first opening and the second opening. This exemplary embodiment or another exemplary embodiment may further provide that the first outer ring comprises: a first end; a second end opposite to the first end; and a first passage defined in the first outer ring extending entirely through the first outer ring between the first end and the second end; wherein the first passage is configured to receive the first portion of the circumferential wall of the inner ring measured between the first end of the inner ring and the collar of the inner ring. This exemplary embodiment or another exemplary embodiment may further provide that the second outer ring comprises: a first end; a second end opposite to the first end; and a second passage defined in the second outer ring extending entirely through the second outer ring between the first end of the second outer ring and the second end of the second outer ring; wherein the second passage is configured to receive the second portion of the circumferential wall of the inner ring measured between the second end of the inner ring and the collar of the inner ring. This exemplary embodiment or another exemplary embodiment may further provide that the inner ring further comprises: at least one attachment aperture defined in the circumferential wall of the inner ring between the collar and one of the first end and the second end. This exemplary embodiment or another exemplary embodiment may further provide that the inner ring further comprises: at least one upper attachment aperture defined in the circumferential wall of the inner ring between the collar and the first end. This exemplary embodiment or another exemplary embodiment may further provide that the inner ring further comprises: at least one lower attachment aperture defined in the circumferential wall of the inner ring between the collar and the second end. This exemplary embodiment or another exemplary embodiment may further provide at least one attachment mechanism operably engages with the inner ring via one of the at least one upper attachment aperture and the at least one lower attachment aperture; wherein the at least one attachment mechanism is adapted to attach the inner ring with a base component of a davit crane. This exemplary embodiment or another exemplary embodiment may further provide that the first outer ring further comprises: a first end; a second end opposite to the first end; a first circumferential wall extending between the first end and the second end; and a first set of attachment holes extending entirely through the first circumferential wall from the first end and the second end. This exemplary embodiment or another exemplary embodiment may further provide that the second outer ring further comprises: a first end; a second end opposite to the first end; a second circumferential wall extending between the first end and the second end; and a second set of attachment holes extending entirely through the second circumferential wall from the first end and the second end. This exemplary embodiment or another exemplary embodiment may further provide that each attachment hole of the first set of attachment holes is coaxial with each attachment hole of the second set of attachment holes when the first outer ring and the second outer ring operably engage with the inner ring. This exemplary embodiment or another exemplary embodiment may further provide that a set of connecting mechanisms operably engaging the first outer ring and the second outer ring with one another via the first set of attachment holes and the second set of attachment holes. This exemplary embodiment or another exemplary embodiment may further provide a first end of the inner ring; and a first end of the first outer ring; wherein the first end of the inner ring is positioned vertically above the first end of the first outer ring at a distance away from said first end of said first outer ring. This exemplary embodiment or another exemplary embodiment may further provide a second end of the inner ring; and a second end of the second outer ring; wherein the second end of the inner ring is positioned vertically below the second end of the second outer ring at a distance away from said second end of said second outer ring.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

As illustrated in FIGS. 1-5B and 7A-7B, a davit crane that is generally referred to as 1. As described in more detail below, the davit crane 1 is configured to be selectively pivotally adjustable between a lowered position (see FIGS. 1 and 7A) and a raised position (FIG. 7B) for raising and lowering an object via a pivoting mechanism. As described in more detail below, the davit crane 1 is also configured to be rotatable adjustable about itself for moving object operably engaged with the davit crane 1 about said davit crane 1 while the davit crane 1 is attached to a ground surface. Such operation of the davit crane 1 is described in more detail below.

Figure 2:
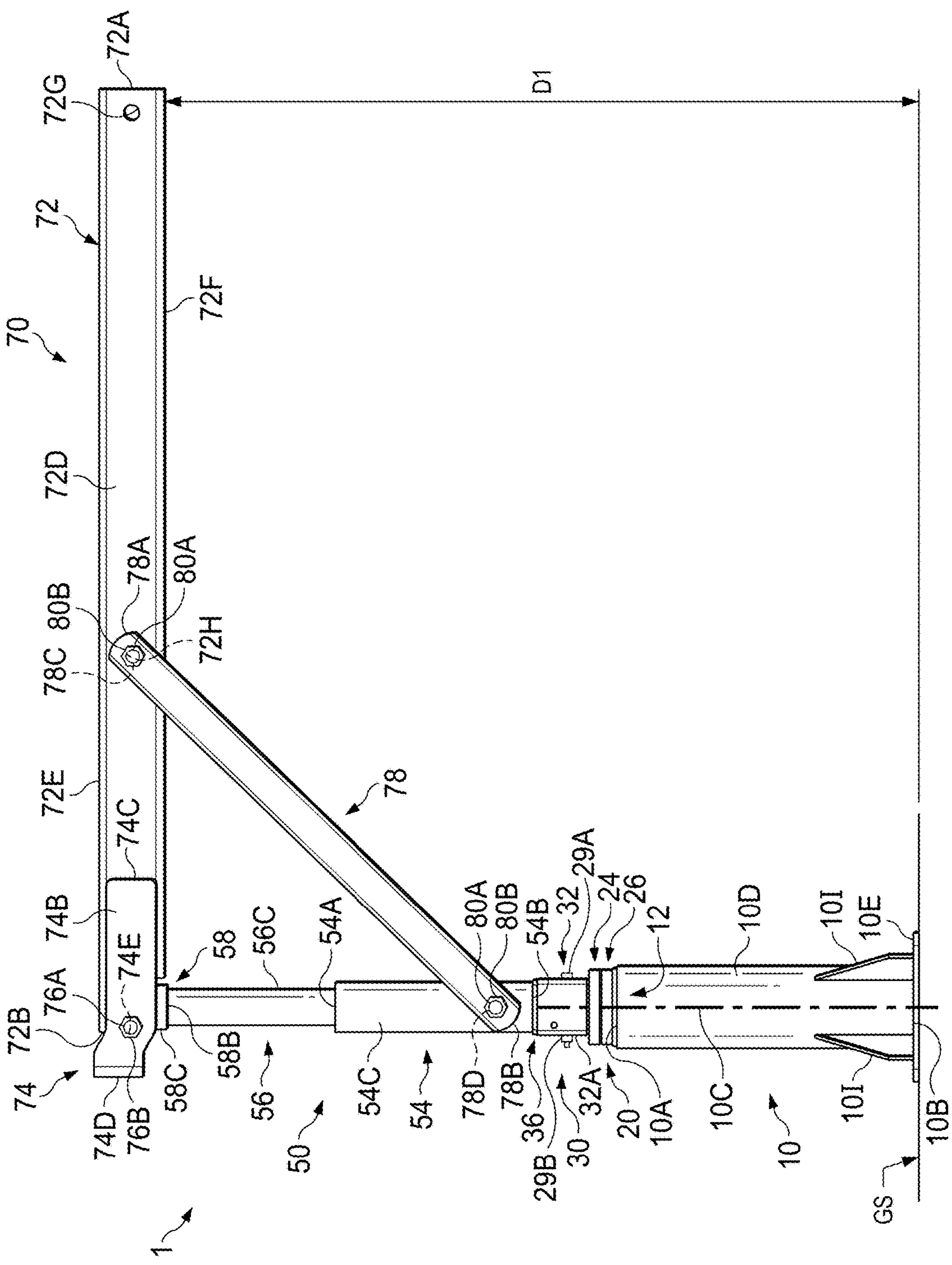
FIG. 2 is a right side elevation view of the davit crane.

The davit crane 1 includes a base 10 that is adapted to operably engaged with a ground surface "GS". Referring to FIG. 2, the base 10 includes a first or top end 10A, a second or bottom end 10B positioned opposite to the top end 10A, and a longitudinal axis 10C defined therebetween. The base 10 also includes a circumferential wall 10D that extends and is bound between the top end 10A and the bottom end 10B. The base 10 also includes a foot 10E that is operably engaged with the circumferential wall 10D at the bottom end 10B of the base 10. The foot 10E also defines a set of mounting holes 10F that extends entirely through the foot 10E along axes parallel with the longitudinal axis 10C of the base 10 (see FIG. 3). The set of mounting holes 10F enables fastening or mounting components (e.g., fasteners, screws, etc.) to operably engage the base 10 with the ground surface "GS" to maintain the position of the davit crane 1 during operation.

Figure 4:
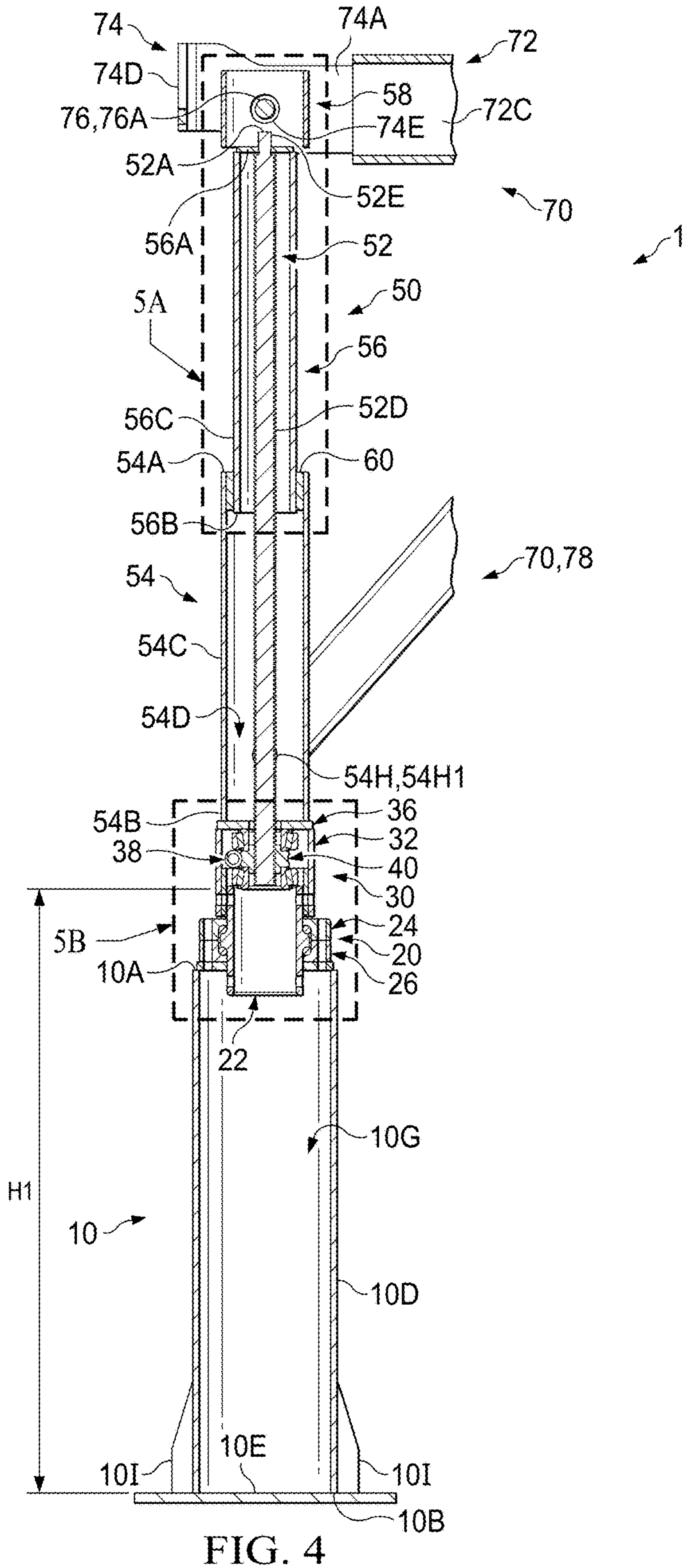
FIG. 4 is a sectional view of the davit crane taken in the direction of line 4 in FIG. 3.

Referring to FIG. 4, a chamber 10G is collectively defined by the circumferential wall 10D and the foot 10E of the base 10. The chamber 10G is also accessible by a top opening 10H defined by the circumferential wall 10D at the top end 10A of the base 10. Such use and purpose of each of the chamber 10G and the top opening 10H is described in more detail below.

Referring to FIG. 2, the base 10 also includes at least one gusset plate 10I. The at least one gusset plate 10I is operably engaged with the circumferential wall 10D and the foot 10E to provide lateral and/or transverse support between the circumferential wall 10D and the foot 10E. In the illustrated, the at least one gusset plate 10I is welded to the circumferential wall 10D and the foot 10E. In other exemplary embodiments, any suitable type of engagement may be used to operably engage at least one gusset to a circumferential wall and a foot based on various considerations, including the size, shape, and configuration of a base, the material of the base, and other various considerations. In the illustrated embodiment, the base 10 include four gusset plates 10I that operably engaged with the circumferential wall 10D and the foot 10E at different position about the base 10. In other exemplary embodiment, any suitable number of gussets may be operably engaged with a circumferential wall and a foot of a base based on various considerations, including the size, shape, and configuration of the gussets, the circumferential wall, and the foot.

Figure 5A:
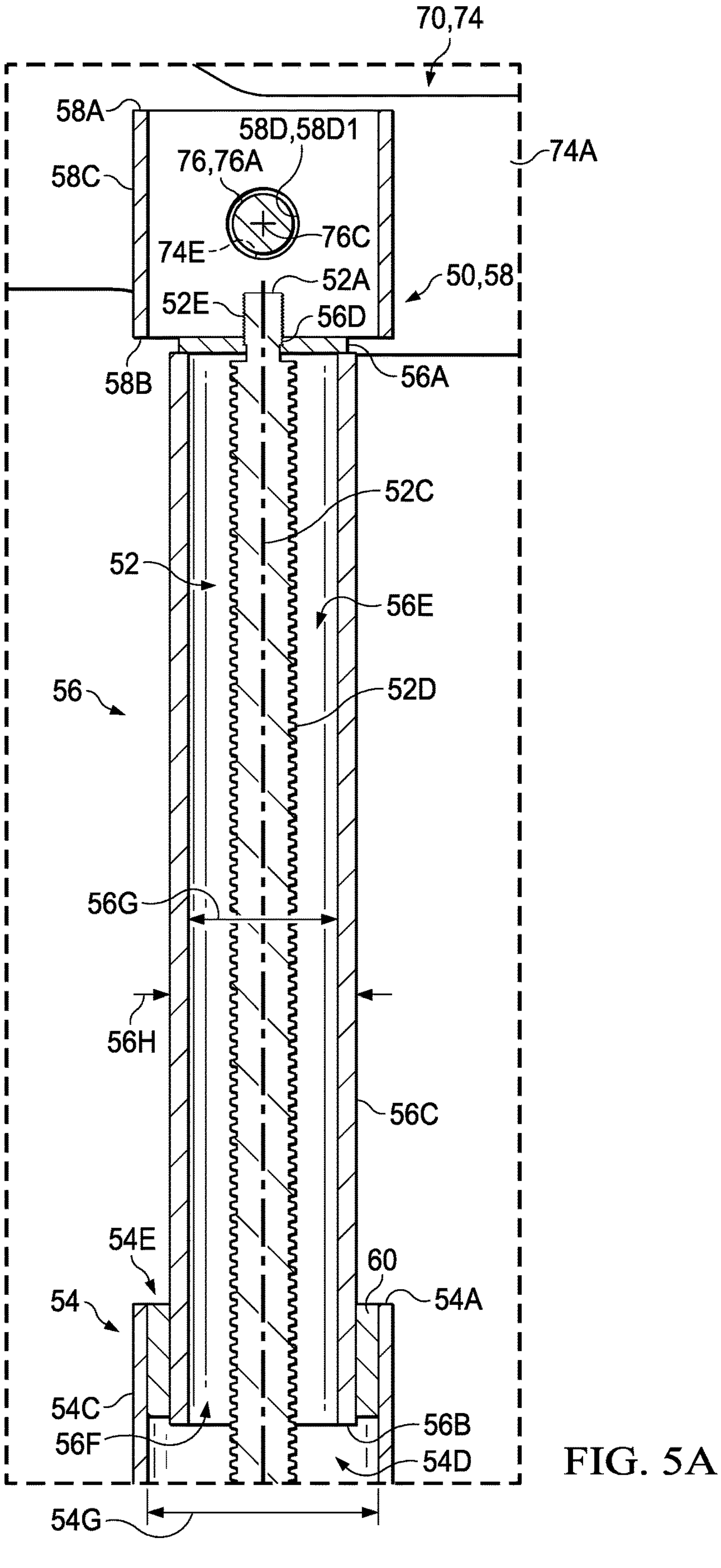
FIG. 5A is an enlargement view of the highlighted region shown in FIG. 4 denoted FIG. 5A.
Figure 5B:
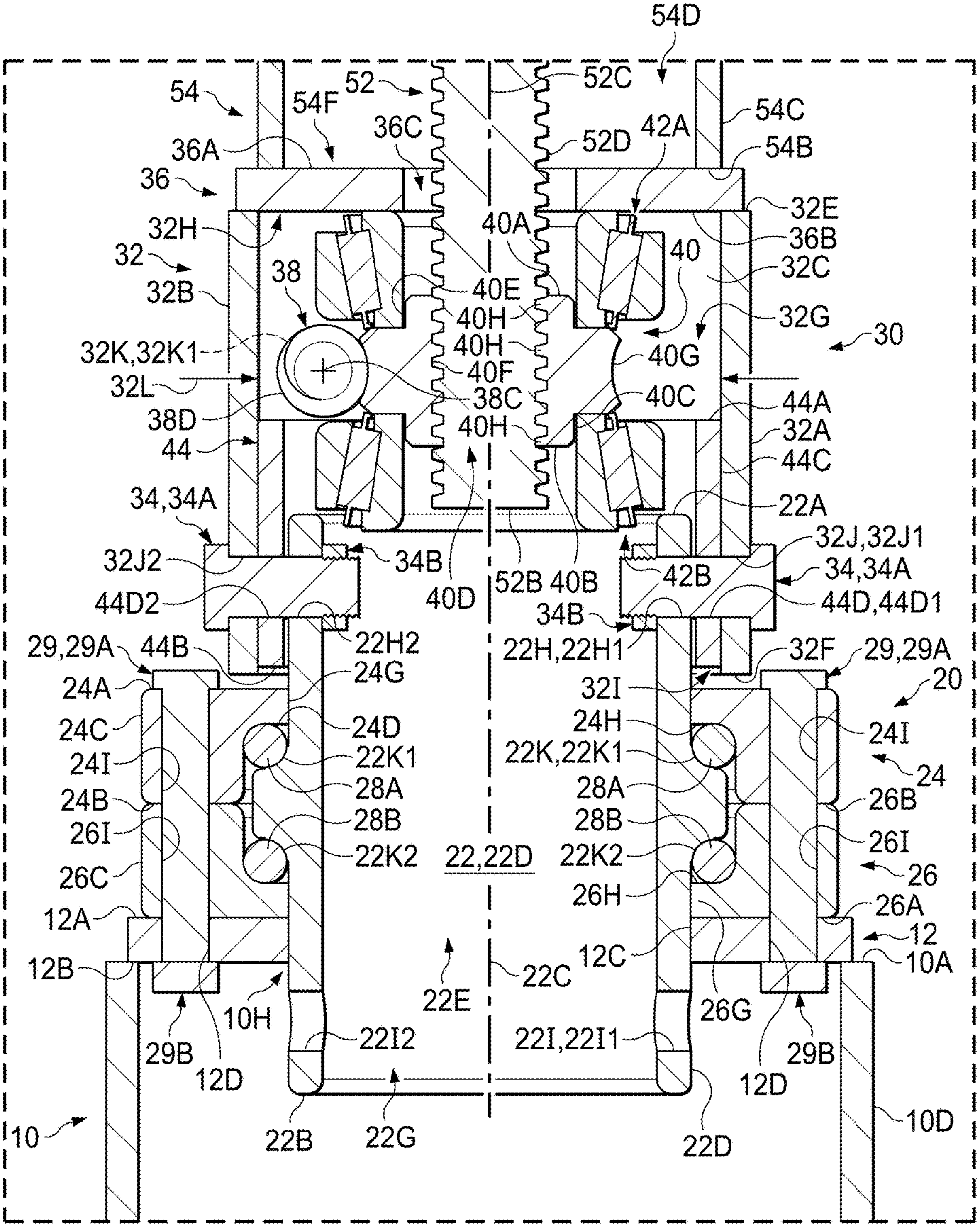
FIG. 5B is an enlargement view of the highlighted region shown in FIG. 4 denoted FIG. 5B.

The davit crane 1 also includes a mount plate 12 that operably engages with the base 10. Referring to FIG. 5B, the mount plate 12 includes an upper surface 12A and a lower surface 12B opposite to the upper surface 12A that operably engages with the circumferential wall 10D of the base 10 at the top end 10A of said base 10. The mount plate 12 is positioned opposite to the foot 10E of the base 10 relative to the longitudinal axis 10C of the base 10. The mount plate 12 also defines a central aperture 12C that extends entirely through the mount plate 12 where the upper surface 12A and the lower surface 12B are in fluid communication with one another at the central aperture 12C. The mount plate 12 also defines a set of mounting apertures 12D that surrounds the central apertures 12C. The set of mounting apertures 12D also extends entirely through the mount plate 12 where the upper surface 12A and the lower surface 12B are in fluid communication with one another at each mounting apertures of the set of mounting apertures 12D. Such use and purpose of the central aperture 12C and the set of mounting apertures 12D is described in more detail below.

The davit crane 1 also includes a slew bearing 20 that operably engages with at least the mount plate 12 and components and/or assemblies of the davit crane 1, which is described in more detail below. The slew bearing 20 enables the davit crane 1 to be rotatable adjustable about itself for moving object operably engaged with the davit crane 1 about said davit crane 1 while the davit crane 1 is attached to the ground surface "GS" by the base 10.

Figure 6:
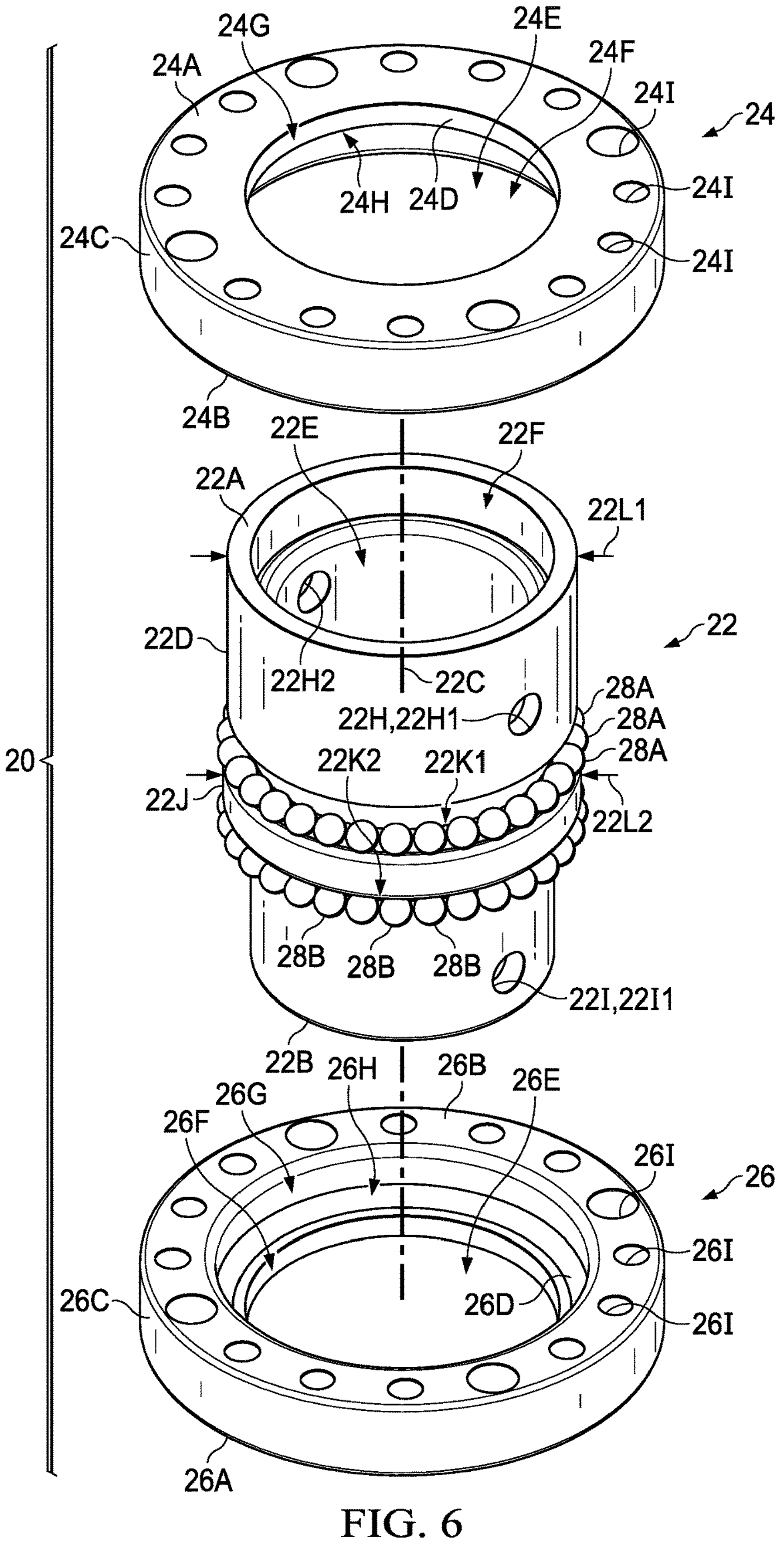
FIG. 6 is an exploded isometric perspective view of a slew bearing provided in the davit crane.

The slew bearing 20 includes an inner ring 22. Referring to FIG. 6, the inner ring 22 includes a first or upper end 22A, a second or lower end 22B opposite to the upper end 22A, and a longitudinal axis 22C defined therebetween. The inner ring 22 also includes a circumferential wall 22D that extends and is bound from the upper end 22A to the lower end 22B. The circumferential wall 22D of the inner ring 22 also defines a passageway 22E that extends from the upper end 22A to the lower end 22B along an axis parallel with the longitudinal axis 22C. The passageway 22E is accessible via an upper opening 22F defined at the upper end 22A of the inner ring 22. The passageway 22E is also accessible via a lower opening 22G defined at the lower end 22B of the inner ring 22 opposite to the upper opening 22F (see FIG. 56).

Still referring to FIG. 6, the inner ring 22 also defines at least one upper attachment aperture 22H. Specifically, the at least one upper attachment aperture 22H is defined in the circumferential wall 22D of the inner ring 22 where the passageway 22E and the exterior environment of the inner ring 22 are in fluid commination with one another via the at least one upper attachment aperture 22H. Such use and purpose of the at least one upper attachment aperture 22H is described in more detail below. In the illustrated embodiment, the circumferential wall 22D defines a first upper attachment aperture 22H1 and a second upper attachment aperture 22H2; the first and second upper attachment apertures 22H1, 22H2 oppose one another and are coaxial with one another along an axis that is orthogonal to the longitudinal axis 22C of the inner ring 22.

Still referring to FIG. 6, the inner ring 22 also defines at least one lower attachment aperture 22I. Specifically, the at least one lower attachment aperture 22I is defined in the circumferential wall 22D of the inner ring 22 where the passageway 22E and the exterior environment of the inner ring 22 are in fluid commination with one another via the at least one lower attachment aperture 22I. The at least one lower attachment aperture 22I is defined vertically below the at least one upper attachment aperture 22H relative to the longitudinal axis 22C of the inner ring 22. Such use and purpose of the at least one lower attachment aperture 22I is described in more detail below. In the illustrated embodiment, the circumferential wall 22D defines a first lower attachment aperture 22I1 and a second lower attachment aperture 22I2 (see FIG. 56); the first and second lower attachment apertures 2211, 2212 oppose one another and are coaxial with one another along an axis that is orthogonal to the longitudinal axis 22C of the inner ring 22.

Still referring to FIG. 6, the inner ring 22 also includes a collar 22J that extends radially outwardly from the circumferential wall 22D along an axis orthogonal to the longitudinal axis 22C of the inner ring 22. The collar 22J is also positioned between the upper end 22A and the lower end 22B of the inner ring 22. As illustrated herein, the collar 22J and the circumferential wall 22D is a single, unitary member that makes up the inner ring 22. In other exemplary embodiments, a collar and a circumferential wall of an inner ring may be separate, individual components operably engaged with one another via a suitable structural engagement to make up the inner ring.

The inner ring 22 also includes at least one raceway 22K defined in the collar 22J. Referring to FIG. 6, the inner ring 22 includes an upper raceway 22K1 that is defined in the collar 22J. The upper raceway 22K1 extends downwardly into the collar 22J towards the lower end 22B along an axis that is parallel with the longitudinal axis 22C. Still referring to FIG. 6, the inner ring 22 also includes a lower raceway 22K2 that is defined in the collar 22J. The lower raceway 22K2 extends upwardly into the collar 22J towards the upper end 22A along an axis that is parallel with the longitudinal axis 22C. The upper raceway 22K1 and the lower raceway 22K2 directly oppose one another and face away from one another where the upper raceway 22K1 faces towards the upper end 22A and the lower raceway 22K2 faces towards the lower end 22B. Such use and purpose of the upper and lower raceways 22K1, 22K2 is described in more detail below.

Still referring to FIG. 6, the circumferential wall 22D also defines a first outer diameter 22L1 that continuous between the upper end 22A and the lower end 22B. The collar 22J also defines a second outer diameter 22L2 where the second outer diameter 22L2 is greater than the first outer diameter 22L1 of the circumferential wall 22D.

The slew bearing 20 also includes a first outer ring 24 operably engaged with the inner ring 22. Specifically, the first outer ring 24 operably engages about a portion of the inner ring 22 between the upper end 22A and the collar 22J of the inner ring 22 (see FIG. 56). Referring to FIG. 6, the first outer ring 24 includes a first end 24A, a second end 24B opposite to the first end 24A, and a circumferential wall 24C that extends and is bound between the first end 24A and the second end 24B. The first outer ring 24 also includes a lip 24D provided on the circumferential wall 24C proximate to the first end 24A of the first outer ring 24. As illustrated in FIGS. 5B and 6, the lip 24D extends radially inwardly from the circumferential wall 24C and into a passage 24E defined by the circumferential wall 24C. The passage 24E extends from the first end 24A to the second end 24B of the first outer ring 24. The passage 24E is also accessible by an outer opening 24F defined by the lip 24D at the first end 24A of the first outer ring 24. The passage 24E is also accessible by an inner opening 24G defined by the circumferential wall 24C at the second end 24B of the first outer ring 24; the inner opening 24G is opposite to the outer opening 24F.

Referring to FIGS. 5B and 6, the first outer ring 24 also defines a first interior raceway 24H in the lip 24D. Specifically, the first interior raceway 24H extends upwardly into the lip 24D towards the first end 24A of the first outer ring 24. Upon assembly of the slew bearing 20, the first interior raceway 24H faces the upper raceway 22K1 of the inner ring 22. Such use and purpose of the first interior raceway 24H is described in more detail below.

Still referring to FIGS. 5B and 6, the first outer ring 24 also defines a set of attachment holes 241. The set of attachment holes 241 extends entirely through the circumferential wall 24C from the first end 24A to the second end 24B. The set of attachment holes 241 is separate and isolated from the passage 24E defined by the circumferential wall 22D. Such use and purpose of the set of attachment holes 241 is described in more detail below.

The slew bearing 20 also includes a second outer ring 26 operably engaged with the inner ring 22. Specifically, the second outer ring 26 operably engages about a portion of the inner ring 22 between the lower end 22B and the collar 22J of the inner ring 22 (see FIG. 56). The second outer ring 26 opposes the first outer ring 24 on the inner ring 22 when the slew bearing 20 is assembled. Additionally, the first outer ring 24 and the second outer ring 26 are substantially identical to one another and are positioned on the inner ring 22 in a mirrored-image orientation.

Referring to FIG. 6, the second outer ring 26 includes a first end 26A, a second end 26B opposite to the first end 26A, and a circumferential wall 26C that extends and is bound between the first end 26A and the second end 26B. The second outer ring 26 also includes a lip 26D provided on the circumferential wall 26C proximate to the first end 26A of the second outer ring 26. As illustrated in FIGS. 5B and 6, the lip 26D extends radially inwardly from the circumferential wall 26C and into a passage 26E defined by the circumferential wall 26C. The passage 26E extends from the first end 26A to the second end 26B of the second outer ring 26. The passage 26E is also accessible by an outer or first opening 26F defined by the lip 26D at the first end 26A of the second outer ring 26. The passage 26E is also accessible by an inner or second opening 26G defined by the circumferential wall 26C at the second end 26B of the second outer ring 26; the second opening 26G opposite to the first opening 26F.

Referring to FIGS. 5B and 6, the second outer ring 26 also defines a second interior raceway 26H in the lip 26D. Specifically, the second interior raceway 26H extends downwardly into the lip 26D towards the first end 26A of the second outer ring 26. Upon assembly of the slew bearing 20, the second interior raceway 26H faces the lower raceway 22K2 of the inner ring 22. Such use and purpose of the second interior raceway 26H is described in more detail below.

Still referring to FIGS. 5B and 6, the second outer ring 26 also defines a set of attachment holes 261. The set of attachment holes 261 extends entirely through the circumferential wall 26C from the first end 26A to the second end 26B. The set of attachment holes 261 is separate and isolated from the passage 26E defined by the circumferential wall 26C. Such use and purpose of the set of attachment holes 261 is described in more detail below.

The slew bearing 20 also includes a first set of balls 28A that operably engages with the inner ring 22 and the first outer ring 24. As illustrated in FIGS. 5B and 6, the first set of balls 28A operably engages with the collar 22J inside of the upper raceway 22K1 of the inner ring 22. The first set of balls 28A also operably engages with lip 24D inside of the first interior raceway 24H of the first outer ring 24. During operation, the first set of balls 28A enables the inner ring 22 to rotate about the longitudinal axis 22C relative to the first outer ring 24.

The slew bearing 20 also includes a second set of balls 28B that operably engages with the inner ring 22 and the second outer ring 26. As illustrated in FIGS. 5B and 6, the second set of balls 28B operably engages with the collar 22J inside of the lower raceway 22K2 of the inner ring 22. The second set of balls 28B also operably engages with lip 26D inside of the second interior raceway 26H of the second outer ring 26. During operation, the second set of balls 28B enables the inner ring 22 to rotate about the longitudinal axis 22C relative to the second outer ring 26.

Referring to FIG. 5B, a set of connection mechanisms 29 operably engages the first outer ring 24 and the second outer ring 26 with the mount plate 12 and maintains the inner ring 22 inside of the first and second outer rings 24, 26. The set of connection mechanisms 29 includes bolts 29A that extend through the first and second outer rings 24, 26 via the set of attachment holes 241, 261 and extend through the mount plate 12 via the set of mounting apertures 12D to operably engage the first outer ring 24 and the second outer ring 26 with the mount plate 12. The set of connection mechanisms 29 also includes nuts 29B that threadably engage with the bolts 29A to hold the first outer ring 24 and the second outer ring 26 with the mount plate 12. Once assembled with the mount plate 12, the inner ring 22 is freely rotatable about the first and second outer rings 24, 26 via the first and second sets of balls 28A, 28B operably engaging each of the inner ring 22, the first outer ring 24, and the second outer ring 26.

The davit crane 1 also includes a drive assembly 30 that operably engages with the one or both of the base 10 and/or the slew bearing 20. In the illustrated embodiment, the drive assembly 30 operably engages with the inner ring 22 of the slew bearing 20 in which the slew bearing 20 and the drive assembly 30 collectively rotate with one another relative to the first and second outer rings 24, 26, the mount plate 12, and the base 10. In other words, the drive assembly 30 is rotatably adjustable relative to the mount plate 12 and the base 10.

Referring to FIG. 5B, the drive assembly 30 includes a housing 32 operably engaged with the inner ring 22 of the slew bearing 20. The housing 32 include a first or front wall 32A and a second or rear wall 32B opposite to the front wall 32A. The housing 32 also includes a third or left wall 32C positioned between the first and second walls 32A, 32B, and a fourth or right wall 32D positioned between the front and rear walls 32A, 32B and opposite to the first side wall 32D. The housing 32 also includes a top end 32E and a bottom end 32F opposite to the top end 32E.

Still referring to FIG. 5B, the first wall 32A, the second wall 32B, the third wall 32C, and the fourth wall 32D collectively define a passageway 32G that extends and is bound between the top end 32E and the bottom end 32F. The passageway 32G is accessible by a top opening 32H collectively defined by the first wall 32A, the second wall 32B, the third wall 32C, and the fourth wall 32D at the top end 32E. The passageway 32G is accessible by a bottom opening 32I collectively defined by the first wall 32A, the second wall 32B, the third wall 32C, and the fourth wall 32D at the bottom end 32F opposite to the top opening 32H.

Still referring to FIG. 5B, one of the first wall, second wall, third wall, and fourth wall 32A, 32B, 32C, 32D defines at least one attachment through-hole 32J. The at least one attachment through-hole 32J extends entirely through the one of the first wall, second wall, third wall, and fourth wall 32A, 32B, 32C, 32D where the passageway 32G and the exterior environment of the housing 32 are in fluid communication with one another at the at least one attachment through-hole 32J. Upon assembly of the davit crane 1, the at least one attachment through-hole 32J is coaxial and/or aligned with the at least one upper attachment aperture 22H defined in the inner ring 22 of the slew bearing 20 for attachment purposes, which is described in more detail below. In the illustrated embodiment, a first attachment through-hole 32J1 is defined by the housing 32 and extends entirely through the first wall 32A where the first attachment through-hole 32J1 is coaxial with the first upper attachment aperture 22H1 defined in the inner ring 22. In the illustrated embodiment, a second attachment through-hole 32J2 is defined by the housing 32 and extends entirely through the second wall 32B where the second attachment through-hole 32J2 is coaxial with the second upper attachment aperture 22H2 defined in the inner ring 22.

Still referring to FIG. 5B, one of the first wall, second wall, third wall, and fourth wall 32A, 32B, 32C, 32D defines at least one drive opening 32K. The at least one drive opening 32K extends entirely through the one of the first wall, second wall, third wall, and fourth wall 32A, 32B, 32C, 32D where the passageway 32G and the exterior environment of the housing 32 are in fluid communication with one another at the at least one drive opening 32K. Upon assembly of the davit crane 1, the at least one drive opening 32K allows for other drive components of the drive assembly 30 to be received by the housing 32 for driving purposes, which is described in more detail below. In the illustrated embodiment, a first drive opening 32K1 extends entirely through the third wall 32C and a second drive opening 32K2 extends entirely through the fourth wall 32D (see FIG. 1) where the first drive opening 32K1 and the second drive opening 32K2 are coaxial with one another.

Still referring to FIG. 5B, the drive assembly also includes an attachment mechanism 34 that operably engages the housing 32 and the inner ring 22 of the slew bearing 20 with one another. The attachment mechanism 34 includes a bolt 34A that extend through the inner ring 22 via the first and second upper attachment apertures 22H1, 22H2 and through the housing 32 via the first and second attachment through-holes 32J1, 32J2 to operably engage the inner ring 22 and the housing 32 with one another. The attachment mechanism 34 also includes a nut 34B that threadably engages with the bolt 34A to secure the bolt 34A with the inner ring 22 and the housing 32. Once assembled, the inner ring 22 and the housing 32 are freely rotatable about the first and second outer rings 24, 26 via the first and second sets of balls 28A, 28B operably engaging each of the inner ring 22, the first outer ring 24, and the second outer ring 26.

Still referring to FIG. 5B, the drive assembly 30 also includes a top plate 36 operably engaged with the housing 32. The top plate 36 includes a top surface 36A and a bottom surface 36B opposite to the top surface 36A. The bottom surface 36B of the top plate 36 operably engages with the first wall, second wall, third wall, and fourth wall 32A, 32B, 32C, 32D at the top end 32E of the housing 32. The top plate 36 also defines a central through-hole 36C that extends entirely through the top plate 36 where the top surface 36A and the bottom surface 36B are in fluid communication with one another via the central through-hole 36C. Once the housing 32 and the top plate 36 operably engage one another, the central through-hole 36C defined in the top plate 36 is aligned with the top opening 32H defined in the housing 32.

Figure 1:
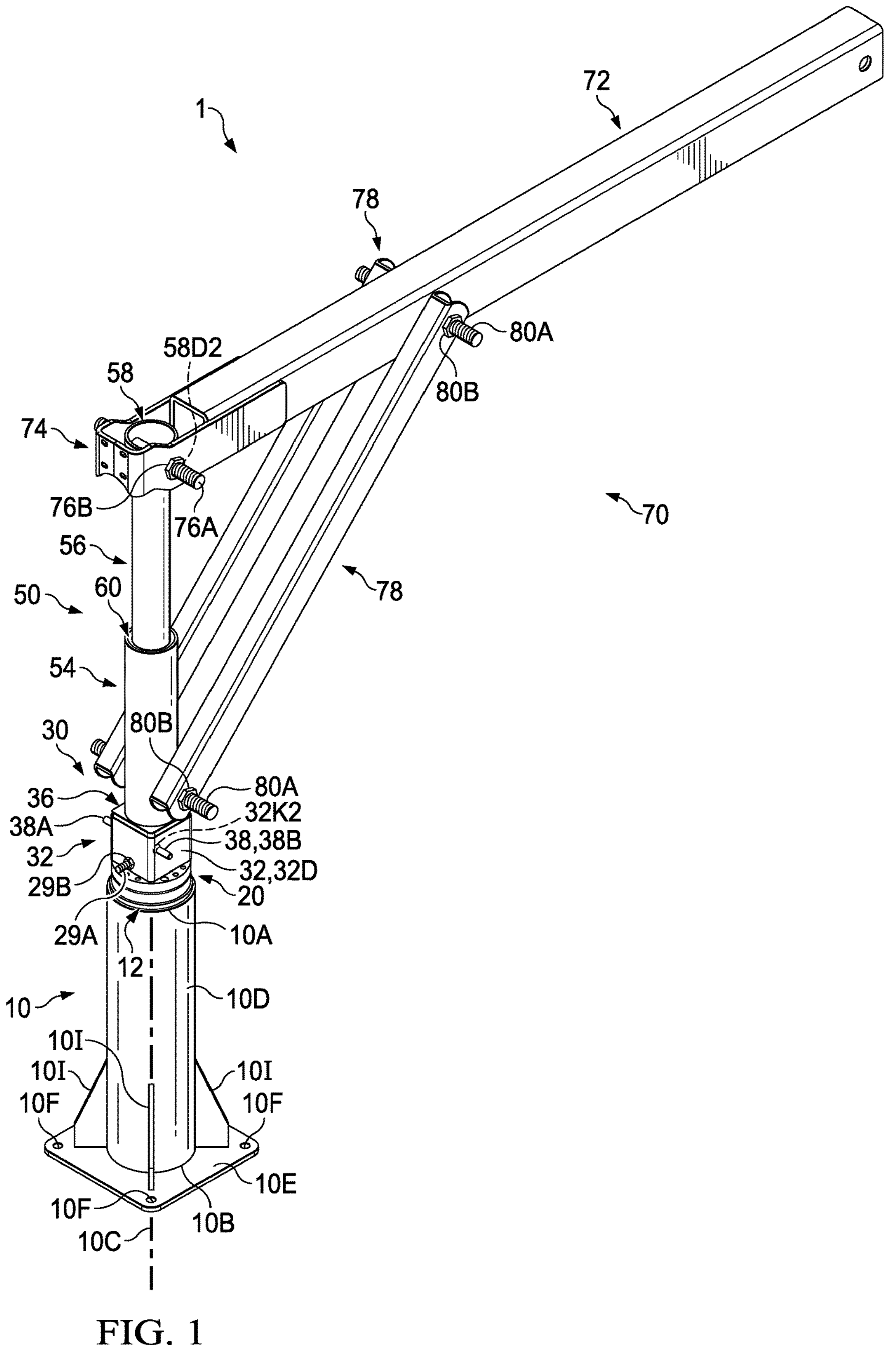
FIG. 1 is a top, rear, right side isometric perspective view of a davit crane in accordance with an aspect of the present disclosure.

Still referring to FIG. 5B, the drive assembly 30 also includes an input drive shaft 38 that is received and partially housed inside of the housing 32 via the first and second drive openings 32K1, 32K2. Referring to FIG. 1, the input drive shaft 38 includes a first end 38A, a second end 38B opposite to the first end 38A, and a longitudinal axis 38C defined therebetween. The first end 38A and the second end 38B are positioned exterior to the passageway 32G defined by the housing 32. The input drive shaft 38 includes a screw gear 38D that radially extends from the input drive shaft 38 and positioned between the first and second ends 38A, 38B; such use and purpose of the screw gear 38D is described in more detail below. The screw gear 38D of the input drive shaft 38 is positioned interior to the passageway 32G defined by the housing 32. The input drive shaft 38 may also define at least one groove (not illustrated) that extends from one of the first end 38A and the second end 38B towards the screw gear 38D. The at least one groove is positioned exterior to the passageway 32G defined by the housing 32. The at least one groove may enable a motor (described below) to operably with the input drive shaft 38.

Still referring to FIG. 5B, the drive assembly 30 also includes a worm gear 40 that is positioned inside of the housing 32 and operably engaged with the input drive shaft 38. The worm gear 40 includes a first or top end 40A, a second or bottom end 40B opposite to the top end 40A, and a circumferential wall 40C that extends between and is bound between the top end 40A and the bottom end 40B. The circumferential wall 40C also defines a passageway 40D that extends between the top end 40A and the bottom end 40B. The circumferential wall 40C has an exterior surface 40E defined exterior to the passageway 40D and an interior surface 40F defined interior to the passageway 40D opposite to the exterior surface 40E.

The worm gear 40 also includes a set of gear teeth 40G. The set of gear teeth 40G is positioned on the circumferential wall 40C of the worm gear 40 between the top end 40A and the bottom end 40B. The set of gear teeth 40G extends outwardly from the exterior surface 40E of the circumferential wall 40C exterior to the passageway 40D. The set of gear teeth 40G of the worm gear 40 are configured to operably mesh with the screw gear 38D of the input drive shaft 38. Such meshing between the input drive shaft 38 and the worm gear 40 enables the input drive shaft 38 to transfer rotational force to the worm gear 40 in which the rotation of the worm gear 40 is dependent upon the rotation generated by the input drive shaft 38.

The worm gear 40 also includes a threading 40H. The threading 40H is positioned on the circumferential wall 40C of the worm gear 40 between the top end 40A and the bottom end 40B. The threading 40H also extends inwardly from the interior surface 40F of the circumferential wall 40C and into the passageway 40D. Such use and purpose of the threading 40H is described in more detail below.

It should be understood that the input drive shaft 38 and the worm gear 40 collectively make up a gear system and/or worm gear system of the drive assembly 30 that is provided and encased inside of the housing 32.

The drive assembly 30 also includes at least one tapered roller bearing 42 that operably engages with the worm gear 40. As illustrated in FIG. 5B, the drive assembly 30 includes a first or upper tapered roller bearing 42A operably engaged with the top plate 36 and the worm gear 40. More particularly, the upper tapered roller bearing 42A operably engages with the bottom surface 36B of the top plate 36 and operably engages with the circumferential wall 40C of the worm gear 40 proximate to the top end 40A. The drive assembly 30 also includes a second or lower tapered roller bearing 42B that operably engages with the inner ring 22 of the slew bearing 20 and the worm gear 40 and opposes the upper tapered roller bearing 42A. More particularly, the lower tapered roller bearing 42B operably engages with the circumferential wall 22D of the inner ring 22 at the upper end 22A and operably engages with the with the circumferential wall 40C of the worm gear 40 proximate to the bottom end 40B. The combination of the upper and lower tapered roller bearings 42A, 42B provide rotational stability and support to the worm gear 40 and other components of the davit crane 1 operably engaged with the worm gear 40, which is described in more detail below.

The drive assembly 30 also includes a fitting pipe 44 positioned between the housing 32 and the inner ring 22 of the slew bearing 20. In other words, the fitting pipe 44 is positioned inside of the passageway 32G of the housing 32 and positioned about a portion of the inner ring 22 of the slew bearing 20. The fitting pipe 44 includes a top or first end 44A, a bottom or second end 44B opposite to the top end 44A, a circumferential wall 44C extending and bound between the top end 44A and the bottom end 44B.

As illustrated in FIG. 5B, the circumferential wall 44C defines at least one attachment through-hole 44D. The at least one attachment through-hole 44D extends entirely through the circumferential wall 44C where interior space of the fitting pipe 44 and the exterior environment of the fitting pipe 44 are in fluid communication with one another. Upon assembly of the davit crane 1, the at least one attachment through-hole 44D is coaxial and/or aligned with the at least one upper attachment aperture 22H defined in the inner ring 22 of the slew bearing 20 and the at least one attachment through hole 32J of the housing 32 for attachment purposes, which is described in more detail below. In the illustrated embodiment, a first attachment through-hole 44D1 extends entirely through the circumferential wall 44C and is coaxial with the first upper attachment aperture 22H1 defined in the inner ring 22 and the first attachment through hole 32J1 of the housing 32. In the illustrated embodiment, a second attachment through-hole 44D2 extends entirely through the circumferential wall 44C and is coaxial with the second upper attachment aperture 22H2 defined in the inner ring 22 and the second attachment through hole 32J2 of the housing 32. Each of the first and second attachment through-holes 44D1, 44D2 is adapted to receive the bolt 34A of the attachment mechanism 34 to enable the bolt 34A to operably engage the fitting pipe 44 with the inner ring 22 and the housing 32. Upon this engagement, the fitting pipe 44 is rotatably moveable with the inner ring 22 and the housing 32 during operation of the davit crane 1.

The input drive shaft 38 of the drive assembly 30 may be powered manually by an operator of the davit crane 1 or automatically by a device or machine operably engaged with the input drive shaft 38. As illustrated in FIGS. 4 and 5B, a motor (not illustrated) is operably engaged at one of the first and second ends 38A, 38B of the input drive shaft 38 to generate rotational force on the input drive shaft 38. The motor may apply rotational force on the input drive shaft 38 causing the worm gear 40 to rotate orthogonally relative to the input drive shaft 38 via the worm drive mechanism between the input drive shaft 38 and the worm gear 40. Such rotational force applied to the input drive shaft 38 by the motor is described in more detail below. The motor described herein may be any suitable motor that is able to raise and lower a range of objects with various weights as desired. Additionally, the motor described herein may be any available or current motor that is obtainable and may be used with the davit crane 1. Examples of suitable motors with a davit crane described and illustrated herein include DC electric motors, AC electric motors, brushed electric motors, brushless electric motors, gear motors, stepper motors, servo motors, linear motors, air or pneumatic motors, hydraulic motors, and other suitable motors of the like.

The davit crane 1 also includes an actuation assembly 50 operably engaged with the drive assembly 30. The actuation assembly 50 is moveable between the lowered position (FIG. 7A) and the raised position (FIG. 7B) via the force applied by the drive assembly 30 to the actuation assembly 50 during operation; such operation of the drive assembly 30 on the actuation assembly 50 is described in more detail below. Additionally, the actuation assembly 50 is rotatable relative to the base 10 due to the actuation assembly 50 being operably engaged with the drive assembly 30 which is operably engaged with the inner ring 22 of the slew bearing 20 (as described above).

The actuation assembly 50 includes a jack screw 52 operably engaged with the drive assembly 30, more particularly the worm gear 40 of the drive assembly 30. Referring to FIG. 5A, the jack screw 52 includes a first end 52A, a second end 52B opposite to the first end 52A, and a longitudinal axis 52C defined therebetween. The jack screw 52 also defines an actuation thread 52D that extends from the second end 52B towards the first end 52A. The actuation thread 52D of the jack screw 52 is configured to operably mesh with the threading 40H of the worm gear 40 for operably engaging the jack screw 52 with the worm gear 40. Such meshing between the jack screw 52 and the worm gear 40 allows the worm gear 40 to transfer rotational force to the jack screw 52 to linearly move the jack screw 52 upwardly and downwardly relative to the base 10 for lifting and raising objects operably engaged with the davit crane 1, which is described in more detail below.

The jack screw 52 also includes an attachment thread 52E that extends from the actuation thread 52D to the first end 52A; such use and purpose of the attachment thread 52E is described in more detail below.

As described above, the jack screw 52 is operably meshed with the worm gear 40. Such meshing between the jack screw 52 and the worm gear 40 enables the jack screw 52 to be rotatable with the drive assembly 30 via the inner ring 22 of the slew bearing 20.

The actuation assembly 50 includes a support column 54 that operably engages with the drive assembly 30, more particularly the top plate 36 of the drive assembly 30. Referring to FIGS. 5A-5B, the support column 54 includes a first or top end 54A, a second or bottom end 54B opposite to the top end 54A, and a circumferential wall 54C extending and bound between the top end 54A and the bottom end 54B. The circumferential wall 54C also defines a passageway 54D that extends between the top end 54A and the bottom end 54B. The passageway 54D is accessible by a top opening 54E defined by the circumferential wall 54C at the top end 54A of the support column 54. The passageway 54D is also accessible by a bottom opening 54F defined by the circumferential wall 54C at the bottom end 54B of the support column 54 where the bottom opening 54F is defined opposite to the top opening 54E. The support column 54 also includes an inner diameter 54G defined by the circumferential wall 54C that is continuous between the top end 54A and the bottom end 54B. As illustrated in FIG. 5A, inner diameter 54G is greater than the diameter of the jack screw 52 to enable the jack screw 52 to travel linearly through the support column 54 during operation, which is described in more detail below.

As illustrated in FIG. 5B, the support column 54 is operably engaged with the top plate 36 of the drive assembly 30. Specifically, the bottom end 54B of the support column 54 is operably engaged with the top surface 36A of the top plate 36. Due to this engagement between the support column 54 and the top plate 36, the support column 54 is rotatable with the drive assembly 30 via the inner ring 22 of the slew bearing 20.

The actuation assembly 50 includes an actuating column 56 that is positioned inside of the passageway 54D of the support column 54 and operably engaged with the jack screw 52. Referring to FIG. 5A, the actuating column 56 includes a first or top end 56A, a second or bottom end 56B opposite to the top end 56A, and a circumferential wall 56C that extends between and is bound between the top end 56A and the bottom end 56B. The actuating column 56 defines a top threaded opening 56D at the top end 56A of the actuating column 56. The top threaded opening 56D of the actuating column 56 enables the attachment thread 52E of the jack screw 52 to threadably engage with one another to secure the actuating column 56 and the jack screw 52 with one another. Upon this engagement, the jack screw 52 transfers linear force to the actuating column 56 in which the jack screw 52 and the actuating column 56 move linearly (both upwardly and downwardly) with one another when driven by the drive assembly 30, which is described in more detail below.

Still referring to FIG. 5A, the circumferential wall 56C also defines a chamber 56E that extends downwardly from the top end 56A to the bottom end 56B. The chamber 56E is accessible by a bottom opening 56F defined by the circumferential wall 56C at the bottom end 56B of actuating column 56. The actuating column 56 also includes an inner diameter 56G defined by the circumferential wall 56C that is continuous between the top end 56A and the bottom end 56B. The inner diameter 56G is greater than the diameter of the jack screw 52 to allow the jack screw 52 to be disposed inside of the chamber 56E. The actuating column 56 also includes an outer diameter 56H defined by the circumferential wall 56C that is continuous between the top end 56A and the bottom end 56B. The outer diameter 56H is less than the inner diameter 54G of the support column 54 to allow the actuating column 56 to longitudinally move through the support column 54 via the jack screw 52, which is also described in more detail below.

The actuation assembly 50 also includes a pivot column 58 that operably engages with the actuating column 56 and other components of the davit crane 1, which is described in more detail below. The pivot column 58 includes a first or top end 58A, a second or bottom end 58B, and a circumferential wall 58C that extends between and is bound between the top end 58A and the bottom end 58B. As illustrated in FIG. 5A, the bottom end 58B of the pivot column 58 operably engages with the top end 56A of the actuating column 56. Such engagement between the pivot column 58 and the actuating assembly 50 enables the actuating assembly 50 to transfer linear force to the pivot column 58 via the jack screw 52 being actuated linearly (both upwardly and downwardly) via the drive assembly 30.

As illustrated in FIG. 5A, the circumferential wall 58C defines at least one linkage through-hole 58D. The at least one linkage through-hole 58D extends entirely through the circumferential wall 58C where an interior space of the pivot column 58 and the exterior environment of the pivot column 58 are in fluid communication with one another. In the illustrated embodiment, a first linkage through-hole 58D1 extends entirely through the circumferential wall 58C. In the illustrated embodiment, a second linkage through-hole 58D2 (see FIG. 1) extends entirely through the circumferential wall 58C where the first and second linkage through-holes 58D1, 58D2 oppose one another and are coaxial with one another. Such uses and purposes of the first and second linkage through-holes 58D1, 58D2 is described in more detail below.

Still referring to FIG. 5A, the actuation assembly 50 also includes a bushing 60. The bushing 60 operably engages with the support column 54 and the actuating column 56 in which the bushing 60 is positioned between the support column 54 and the actuating column 56. More particularly, the bushing 60 is circumferentially disposed about the actuating column 56 exterior to the chamber 56E and is circumferentially disposed in the support column 54 interior to the passageway 54D.

The davit crane 1 also includes a boom assembly 70 operably engaged with the actuation assembly 50 where the boom assembly 70 is to be selectively pivotally adjustable via the actuation assembly 50. The boom assembly 70 is also rotatable with the drive assembly 30 and the actuation assembly 50 relative to the base 10 via the slew bearing 20. Such pivoting and rotation of the boom assembly 70 is described in more detail below.

Figure 3:
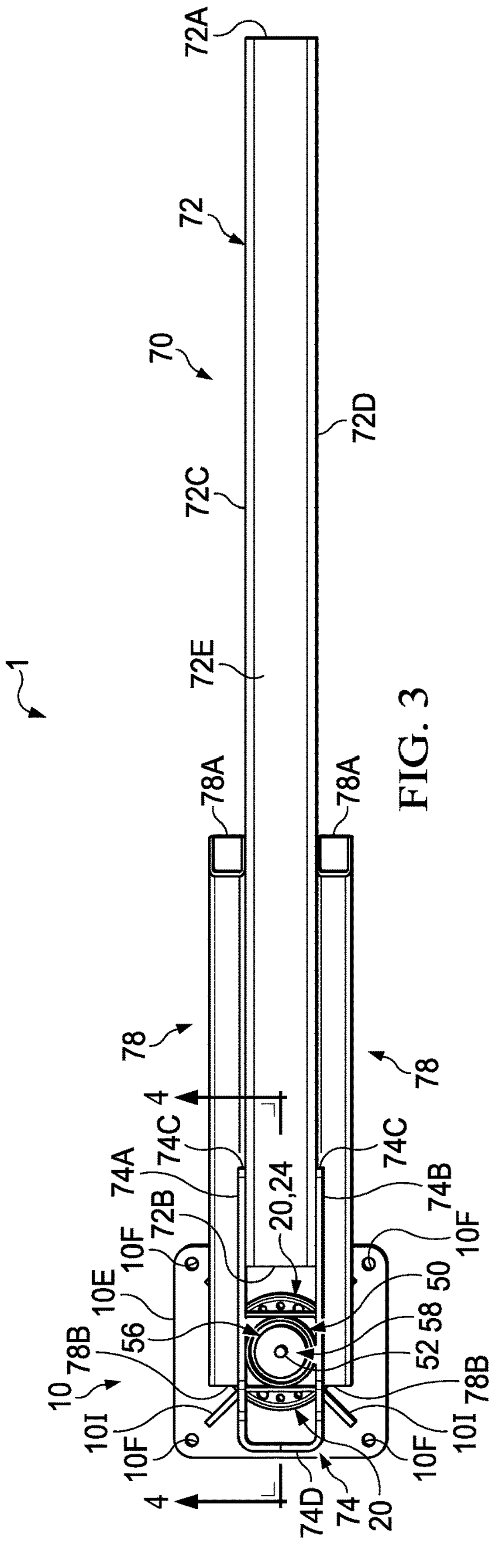
FIG. 3 is a top plan view of the davit crane.

The boom assembly 70 includes a boom arm 72 that operably engages with the actuation assembly 50. Referring to FIGS. 2 and 3, the boom arm 72 includes a first or front end 72A, a second or rear end 72B opposite to the front end 72A, and a longitudinal axis defined therebetween. The boom arm 72 also includes a first or left wall 72C, a second or right wall 72D opposite to the first wall 72C, a third or top wall 72E, and a fourth or bottom wall 72F opposite to the third wall 72E.

As illustrated in FIG. 2, one of the first wall, second wall, third wall, and fourth wall 72C, 72D, 72E, 72F defines at least one front through-hole 72G proximate to the front end 72A of the boom arm 72. The at least one front through-hole 72G extends entirely through the one of the first wall, second wall, third wall, and fourth wall 72C, 72D, 72E, 72F where the interior space of the boom arm 72 and the exterior environment of the boom arm 72 are in fluid communication with one another. In the illustrated embodiment, the boom arm 72 defines two front through holes 72G in the first and second walls 72C, 72D that are coaxial with one another. The two front through holes 72G enable the boom arm 72 to operably engage with a linkage or connection component (e.g., a lift chain or other similar devices of the like) for lifting objects with the davit crane 1.

As illustrated in FIG. 2, one of the first wall, second wall, third wall, and fourth wall 72C, 72D, 72E, 72F defines at least one rear through-hole 72H between the front and rear ends 72A, 72B proximate to the rear end 72B. The at least one rear through-hole 72H extends entirely through the one of the first wall, second wall, third wall, and fourth wall 72C, 72D, 72E, 72F where the interior space of the boom arm 72 and the exterior environment of the boom arm 72 are in fluid communication with one another. In the illustrated embodiment, the boom arm 72 defines two rear through-holes 72H in the first and second walls 72C, 72D and are coaxial with one another. Such uses and purposes of the two rear through-holes 72H are described in more detail below.

The boom assembly 70 also includes an extension member 74 that operably engages with the boom arm 72 proximate to the rear end 72B. The extension member 74 includes a first bracket 74A and a second bracket 74B operably engaged with one another and directly oppose one another in a mirrored-image orientation. In the illustrated embodiment, the first and second brackets 74A, 74B is a single, unitary component that makes up the extension member 74. In one exemplary embodiment, a first bracket and a second bracket of an extension member may be separate components. As illustrated in FIG. 3, the first bracket 74A operably engages with the first wall 72C of the boom arm 72. Still referring to FIG. 3, the second bracket 74B operably engages with the second wall 72D of the boom arm 72. As such, the boom arm 72 and the extension member 74 collectively move with one another when actuated by the actuation assembly 50, which is described in more detail below.

Still referring to FIG. 3, each of the first bracket 74A and the second bracket 74B includes a front end 74C that operably engages with the first and second walls 72C, 72D of the boom arm 72. Each of the first bracket 74A and the second bracket 74B includes a rear end 74D opposite to the front end 74C where the first and second brackets 74A, 74B operably engage with one another. Each of the first and second brackets 74A, 74B defines a mount hole 74E that extends entirely each of the first and second brackets 74A, 74B. Each mount hole 74E of each bracket 74A, 74B is also coaxial with one another. Upon assembly of the davit crane 1, the mount hole 74E of the first bracket 74A is coaxial with the first linkage through-hole 58D1 of the pivot column 58, and the mount hole 74E of the second bracket 74B is coaxial with the second linkage through-hole 58D2 of the pivot column 58.

The boom assembly 70 includes a securement mechanism 76 that operably engages the boom arm 72 and the extension member 74 with the pivot column 58. Referring to FIG. 2, the securement mechanism 76 includes a bolt 76A that extends through the extension member 74 via the mount holes 74E and through the pivot column 58 via the first and second linkage through-holes 58D1, 58D2 to operably engage the extension member 74 and the pivot column 58 with one another. The securement mechanism 76 also includes a nut 76B that threadably engage with the bolt 76A to secure the bolt 76A with the extension member 74 and the pivot column 58. Once assembled, the actuation assembly 50 is enabled to selectively pivotally adjust the boom arm 72 and the extension member 74 at any suitable height relative to the mount plate 12 of the davit crane 1 for lifting objects. As such, the boom arm 72 and the extension member 74 pivot about a longitudinal axis 76C of the bolt 76A when actuated by the actuation assembly 50 during operation.

The boom assembly 70 also includes at least one support arm 78 operably engaged with the boom arm 72 and the support column 54 of the actuation assembly 50. The at least one support arm 78 provides lateral support to the boom arm 72 when the boom arm 72 is pivoted upwardly and downwardly relative to the mount plate 12 during operation. In the illustrated embodiment, the boom assembly includes a two support arms 78 that operably engages with the first and second walls 72C, 72D of the boom arm 72 and the support column 54. The support arms 78 are identical to one another and are operably engaged with the boom arm 72 and the support column 54 in a mirrored-image orientation.

As illustrated in FIGS. 1-3, each support arm 78 includes a first or front end 78A where each support arm 78 operably engages with the boom arm 72. Each support arm 78 also includes a second or rear end 78B that is opposite to the front end 78A where each support arm 78 operably engages with the support column 54.

Each support arm 78 also defines at least one front through-hole 78C proximate to the front end 78A of each support arm 78. The at least one front through-hole 78C extends entirely through each support arm 78 where the interior space of each support arm 78 and the exterior environment of each support arm 78 are in fluid communication with one another. In the illustrated embodiment, each support arm 78 defines two front through-holes 78C that are coaxial with one another in each support arm 78. Such use and purpose of the front through-holes 78C defined in each support arm 78 is described in more detail below.

Each support arm 78 also defines at least one rear through-hole 78D proximate to the rear end 78B of each support arm 78. The at least one rear through-hole 78D extends entirely through each support arm 78 where the interior space of each support arm 78 and the exterior environment of each support arm 78 are in fluid communication with one another. In the illustrated embodiment, each support arm 78 defines two rear through-holes 78D that are coaxial with one another in each support arm 78. Such use and purpose of the rear through-holes 78D defined in each support arm 78 is described in more detail below.

The boom assembly 70 includes locking mechanism 80 that operably engage the support arms 78 with the boom arm 72 and the support column 54 of the actuation assembly 50. Referring to FIG. 2, the locking mechanisms 80 include bolts 80A that extend through each support arm 78 via the front through-holes 78C and through the boom arm 72 via the rear through-holes 72H to operably engage the support arms 78 and the boom arm 72 with one another; bolts 80A also extend through each support arm 78 via the rear through-holes 78D and through the support column 54 via the side openings 54H (such as side opening 54H1 shown in FIG. 4) to operably engage the support arms 78 and the support column 54 with one another. The locking mechanisms 80 also include nuts 80B that threadably engage with the bolts 80A to secure the bolts 80A with the support arms 78 and the boom arm 72 and with the support arms 78 and the support column 54. Once assembled, the support arm 78 are enabled to be pivotable with the boom arm 72 and the extension member 74 when actuated by the actuation assembly 50. As such, the support arms 78 pivot about longitudinal axis 80C of the bolts 80A when actuated by the actuation assembly 50 during operation.

Having now described the assemblies and components of the davit crane 1, a method of using the davit crane 1 is described in more detail below.

Prior to transitioning the davit crane 1 from the lowered position (see FIGS. 1-2) to the raised position (FIG. 76), an operator of the davit crane 1 may attach an object to the davit crane via a linkage or connection component (e.g., a lift chain or other similar devices of the like) for lifting objects with the davit crane 1. Once the object is attached to the connection component, the operator may begin to transition the davit crane from the lowered position to the raised position, which is described in more detail below. In the lowered position, the second end 52B of the jack screw 52 is provided at a first height "H1" relative to the foot 10E of the base 10 (see FIG. 4) In the lowered position, the front end 72A of the boom arm 72 is provided at a first distance "D1" away from the foot 10E of the base 10 (also see FIG. 2).

Figure 7A:
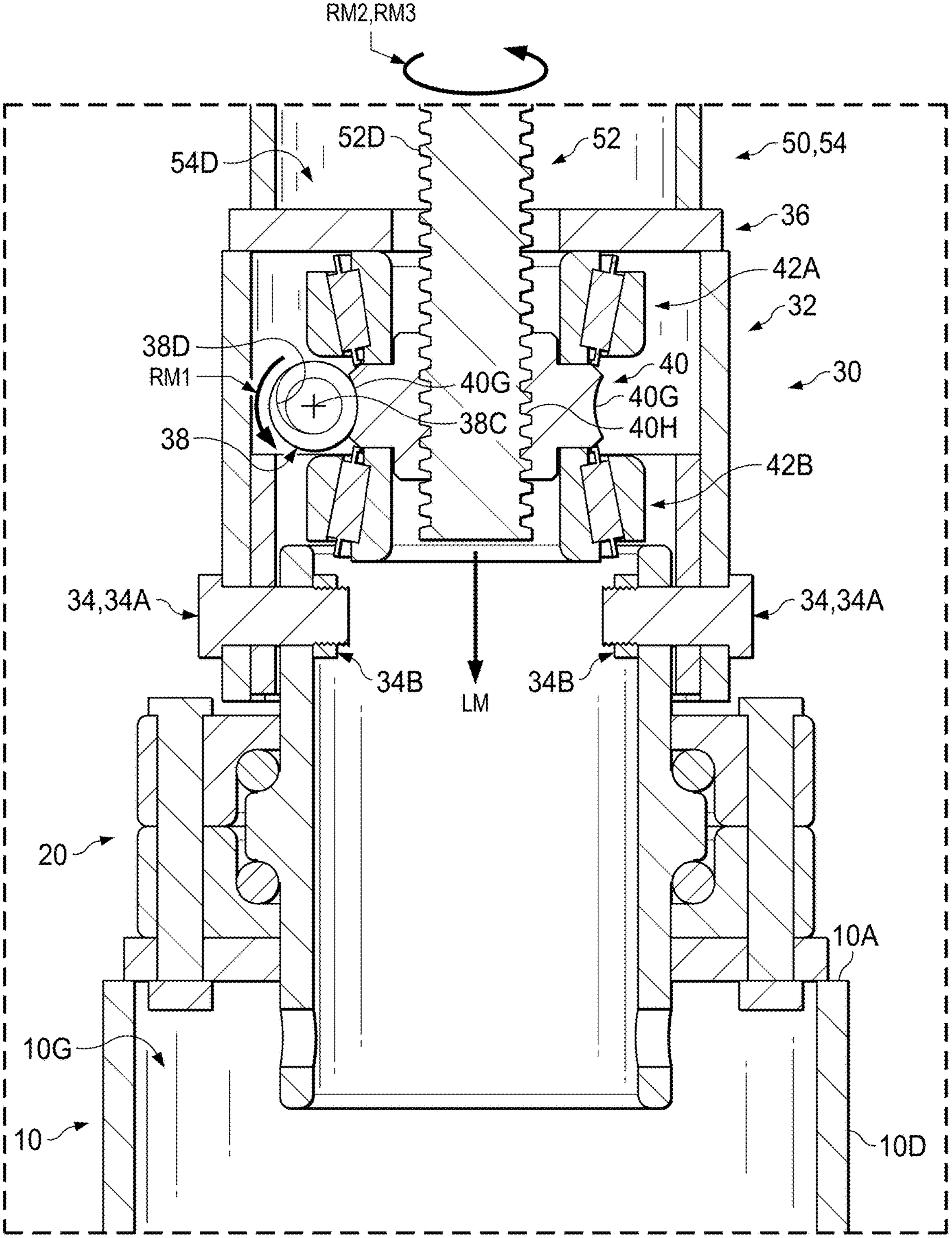
FIG. 7A is an operational view of the davit crane moving from a lowered position to a raised position.
Figure 7B:
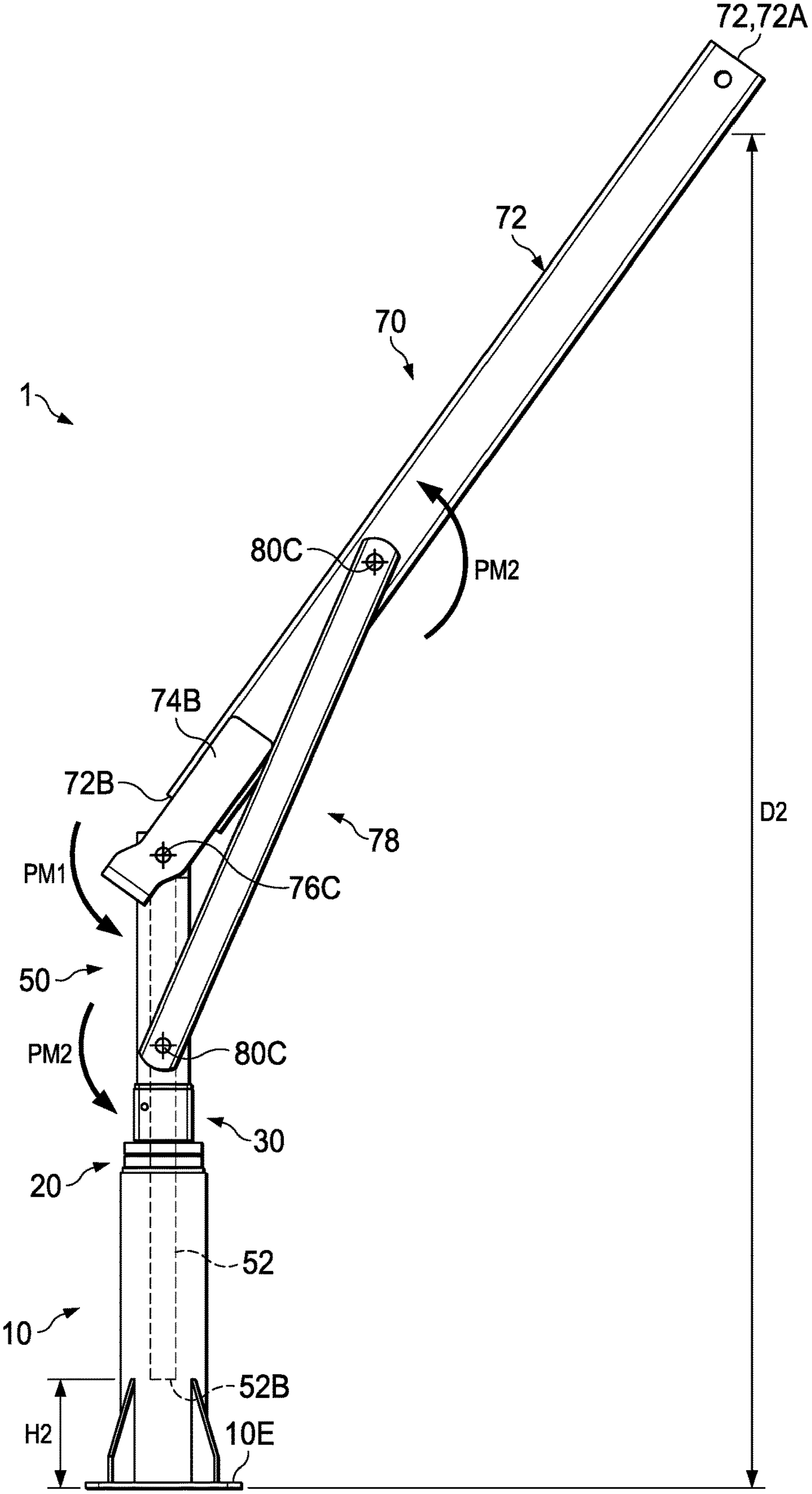
FIG. 7B is an operational view of the davit crane similar to FIG. 7A, but the davit crane is provided in the raised position.

To transition the davit crane 1 from the lowered position to the raised position, an operator of the davit crane 1 initiates a first input on the motor to generate a first rotational force. The first rotational force generated by the motor is applied at one of the first and second ends 38A, 38B of the input drive shaft 38 to rotate the input drive shaft 38 in a first direction. The first rotational force applied to the input drive shaft 38 by the motor is denoted by an arrow labeled "RM1" in FIG. 7A. As shown in FIG. 7A, the input drive shaft 38 is rotated about its longitudinal axis 38C as the motor applies the first rotational force.

Once the input drive shaft 38 begins to rotate, the input drive shaft 38 transfers the first rotational force to the worm gear 40 by applying a second rotational force on the worm gear 40. The second rotational force applied to the worm gear 40 by the input drive shaft 38 is denoted by an arrow labeled "RM2" in FIG. 7A. As shown in FIG. 7A, the second rotational force generated by the input drive shaft 38 is applied at the set of gear teeth 40G of the worm gear 40 via the meshing between the set of gear teeth 40G and the screw gear 38D. Such second rotational force generated by the input drive shaft 38 rotates the worm gear 40 in a second direction that is orthogonal to the first direction of the input drive shaft 38 due to the worm drive mechanism created between the input drive shaft 38 and the worm gear 40.

Once the worm gear 40 begins to rotate, the worm gear 40 transfers the second rotational force to the jack screw 52 by apply a third rotational force on the jack screw 52. The third rotational force applied to the jack screw 52 by the worm gear 40 is denoted by an arrow labeled "RM3" in FIG. 7A. As shown in FIG. 7A, the third rotational force generated by the worm gear 40 is applied along the actuation thread 52D of the jack screw 52 by the threading 40H of the worm gear 40. Such third rotational force generated by the worm gear 40 rotates the worm gear 40 in third direction where the third direction is directed in the same direction as the second direction of the worm gear 40. Upon this rotation, however, the jack screw 52 linearly moves downwardly as the worm gear 40 applies the third rotational force on the jack screw 52. This movement of the jack screw 52 occurs due to the actuation thread 52D of the jack screw 52 and the threading 40H of the worm gear 40 creating a screw mechanism that linearly moves the jack screw 52 downwardly towards the base 10 as the worm gear 40 applies the third rotational force on the jack screw 52. Such downward linear movement of the jack screw 52 is denoted by an arrow labeled "LM" in FIG. 7A.

As the second end 52B of the jack screw 52 begins to move downwardly towards the base 10 and away from the worm gear 40, the actuating column 56 and the pivot column 58 collectively move downwardly with the jack screw 52. Such collective downward movement of the actuating column 56 and the pivot column 58 occurs due to the operable engagement between the jack screw 52, the actuating column 56, and the pivot column 58 (as described above).

As the actuating column 56 and the pivot column 58 move downwardly, the boom arm 72 and the extension member 74 also pivots downwardly towards the base 10. Specifically, the extension member 74 and the rear end 72B of the boom arm 72 pivot downwardly as the jack screw 52 is forced downwardly by the worm gear 40. During this movement, the rear end 72B of the boom arm 72 and the extension member 74 pivot about the longitudinal axis 76C defined by the bolt 76A of the securement mechanism 76 as the davit crane 1 transitions from the lowered position to the raised position. Such pivoting movement of the boom arm 72 and the extension member 74 about the longitudinal axis 76C defined by the bolt 76A of the securement mechanism 76 is denoted by an arrow labeled "PM1" in FIG. 7B. As the rear end 72B of the boom arm 72 pivots downwardly towards the base 10, the front end 72A rotates upwardly away from the base 10 as the davit crane 1 transitions from the lowered position to the raised position. During this rotation, the front end 72A of the boom arm 72 raises the object upwardly from the ground surface to a position desired by the operator.

As the actuating column 56 and the pivot column 58 move downwardly, the support arms 78 of the boom assembly 70 also move rearwardly towards the support column 54 as the boom arm 72 pivots via the actuation assembly 50 and the drive assembly 30. During this transition, the front ends 78A of the support arms 78 move upwardly and pivot about longitudinal axis 80C of the bolts 80A of the locking mechanisms 80 as the front end 72A of the boom arm 72 pivots upwardly. Such pivoting movement of the front ends 78A of the support arms 78 about longitudinal axis 80C of the bolts 80A of the locking mechanisms 80 is denoted by an arrow labeled "PM2" in FIG. 7B. Additionally, the rear ends 78B of the support arms 78 move downwardly and pivot about longitudinal axis 80C of the bolts 80A of the locking mechanisms 80 as the rear end 72B of the boom arm 72 rotates downwardly. Such pivoting movement of the rear ends 78B of the support arms 78 about longitudinal axis 80C of the bolts 80A of the locking mechanisms 80 is denoted by an arrow labeled "PM2" in FIG. 7B.

Once the davit crane 1 reaches the desired raised height, the operator may cease any input to the motor to cease all movement of the davit crane 1. Due to the structural configuration of the drive assembly 30 and the actuation assembly 50, the davit crane 1 maintains the boom arm 72 at the desired raised height until another input is initiated by the operator on the motor. In the raised position, the second end 52B of the jack screw 52 is provided at a second height "H2" relative to the foot 10E of the base 10 (see FIG. 76); the first height "H1" at the lowered position is greater than the second height "H2" at the raised position. In the raised position, the front end 72A of the boom arm 72 is provided at a second distance "D2" away from the foot 10E of the base 10 (see FIG. 76); the second distance "D2" at the raised position is greater than the first distance "D1" at the lowered distance.

Figure 7C:
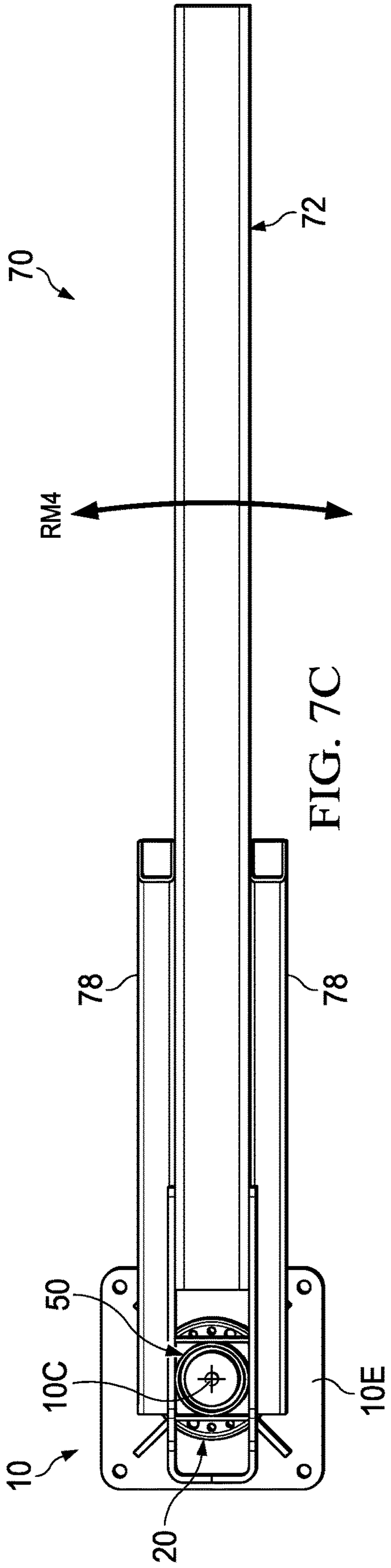
FIG. 7C is an operational view of the davit crane, wherein the boom arm is rotatably moved about a base of the davit crane.

Prior to or subsequent to transitioning the davit crane 1 between the lowered position and the raised position, the operator may rotate the boom arm 72 about the longitudinal axis 10C of the base 10 relative to said base 10. As described above, the inner ring 22 allows the drive assembly 30, the actuation assembly 50, and the boom assembly 70 to rotate about the longitudinal axis 10C of the base 10 due to the inner ring 22 rotating about the first and second outer rings 24, 26 via the first and second sets of balls 28A, 28B. Such collective rotation of the inner ring 22, the drive assembly 30, the actuation assembly 50, and the boom assembly 70 about the about the longitudinal axis 10C of the base 10 is denoted by a double arrow labeled "RM4" in FIG. 7C. As such, the boom assembly 70 may be rotated in either the clockwise direction and/or the counterclockwise direction based on the operator needs for a given situation. In the illustrated embodiment, the operator manually rotates the boom assembly 70 about the base 10 to a desired position. In other exemplary embodiments, a boom assembly 70 may be automatically rotated via a driving mechanism or similar drive component without any operator intervention.

Figure 8:
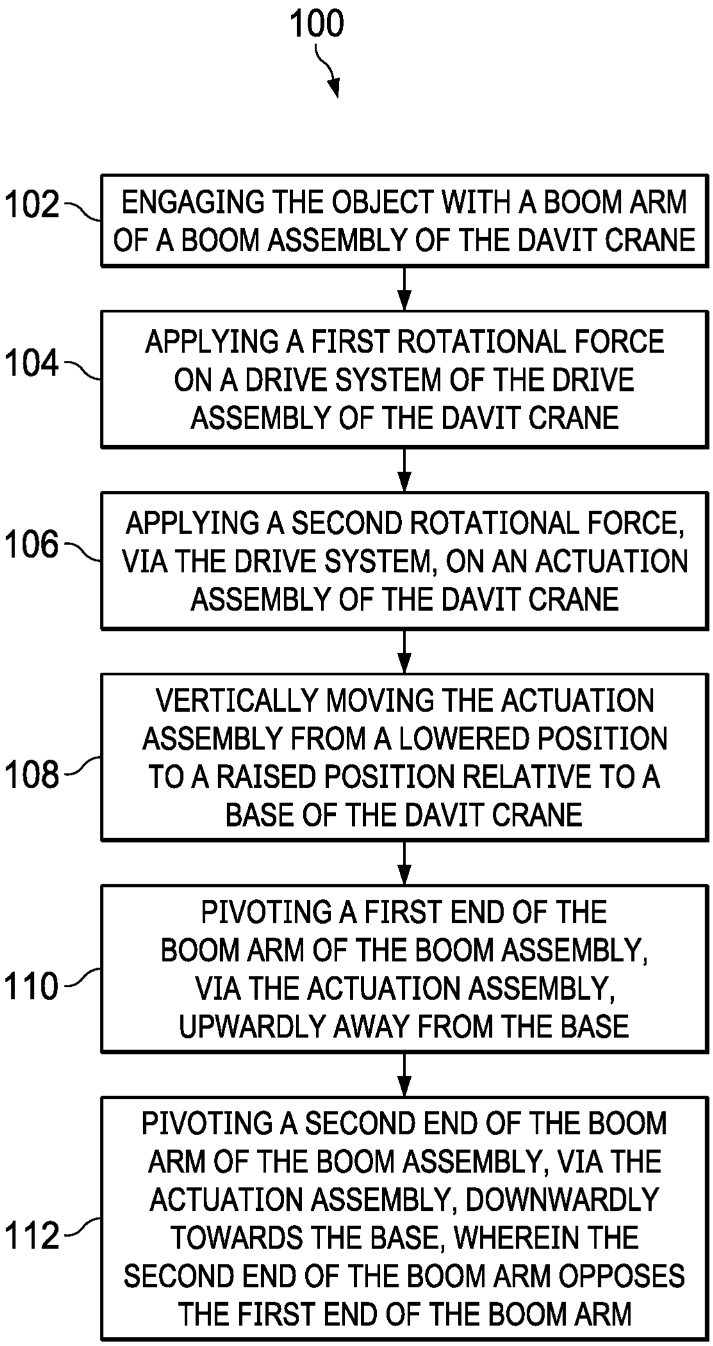
FIG. 8 is a method flowchart of lifting an object with a davit crane.

FIG. 8 illustrates a method 100 of lifting an object with a davit crane. An initial step 102 of method 100 comprises engaging the object with a boom arm of a boom assembly of the davit crane. Another step 104 comprises applying a first rotational force on a gear system of the drive assembly of the davit crane. Another step 106 comprises applying a second rotational force, via the gear system, on an actuation assembly of the davit crane. Another step 108 comprises vertically moving the actuation assembly from a lowered position to a raised position relative to a base of the davit crane. Another step 110 comprises pivoting a first end of the boom arm of the boom assembly, via the actuation assembly, upwardly away from the base. Another step 112 comprises pivoting a second end of the boom arm of the boom assembly, via the actuation assembly, downwardly towards the base, wherein the second end of the boom arm opposes the first end of the boom arm.

In an exemplary embodiment, method 100 may include additional steps of lifting an object with a davit crane. An optional step further comprises that the step of vertically moving the actuation assembly from a lowered position to a raised position relative to a base of the davit crane includes longitudinally moving a jack screw of the actuation assembly downwardly into the base via the gear system. Another optional step further comprises rotating the boom assembly, via a slew bearing, about a longitudinal axis of the base relative to said base.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A davit crane, comprising:

a base adapted to operably engage with a ground surface and having a top end, a bottom end positioned opposite to the top end, and a longitudinal axis defined therebetween a drive assembly operably engaged with the base;

a slew bearing operably engaged with the drive assembly and the base, the slew bearing having:

an inner ring operably engaged with the drive assembly;

a first outer ring operably engaged on the inner ring and operably engaged with the base; and a second outer ring operably engaged on the inner ring opposite to the first outer ring and operably engaged with the base;

an actuation assembly operably engaged with the drive assembly, wherein the actuation assembly is configured to move between a lowered position and a raised position via the drive assembly; and a boom assembly operably engaged with the actuation assembly;

wherein the actuation assembly is operable to pivotably adjust the boom assembly between the raised position and the lowered position;

wherein the inner ring is configured to collectively rotate the actuation assembly, the boom assembly, and the drive assembly about the longitudinal axis of the base.

2. The davit crane of claim 1, wherein the actuation assembly comprises:

a support column;

an actuating column operably engaged with the drive assembly and operably engaged inside of the support column; and wherein the actuating column is vertically moveable relative to the support column to pivot the boom assembly between the lowered position and the raised position.

3. The davit crane of claim 2, wherein the actuation assembly further comprises:

a jack screw operably engaged with the actuating column and operably engaged with the drive assembly;

wherein the jack screw is configured to be longitudinally moveable inside of the support column and the base via the drive assembly; and wherein the jack screw and the actuating column are collectively vertically moveable relative to the support column to pivot the boom assembly between the lowered position and the raised position.

4. The davit crane of claim 2, wherein the actuation assembly further comprises:

a pivot column operably engaged with the actuating column and operably engaged with the boom assembly;

wherein the pivot column enables the actuating column to pivotably adjust the boom assembly between the lowered position and the raised position.

5. The davit crane of claim 2, wherein the boom assembly comprises:

a boom arm configured to operably engaged with the actuation column of the actuation assembly; and at least one support arm operably engaged with the support column of the actuating assembly and operably engaged with the boom arm;

wherein the boom arm and the at least one support arm are pivotable between the raised position and the lowered position.

6. The davit crane of claim 5, wherein the boom assembly further comprises:

a first height measured from a first end of the boom arm to the base when the actuation assembly is provided in the raised position; and a second height measured from the first end the boom arm to the base when the actuation assembly is provided in the lowered position;

wherein the second height is greater than the first height.

7. The davit crane of claim 5, wherein the boom assembly further comprises:

an extension member operably engaged with the boom arm and operably engaged with the actuating column;

wherein the extension member positions the boom arm at a distance away from the actuating column; and wherein the extension member is operable to enable the actuation assembly and the drive assembly to pivotably move the boom arm between the lowered position and the raised position.

8. The davit crane of claim 3, wherein the drive assembly comprises:

a top plate operably engaged with the support column;

a housing operably engaged with the top plate; and a gear system positioned inside of the housing and operably engaged with a fitting pipe;

wherein the gear system is operable to longitudinally move the jack screw and the actuating column between the raised position and the lowered position.

9. The davit crane of claim 8, wherein the gear system of the drive assembly comprises:

an input drive shaft operably engaged with the housing; and a worm gear operably meshed with the input drive shaft inside of the housing and threadably engaged with the jack screw inside of the housing.

10. The davit crane of claim 9, wherein the gear system of the drive assembly further comprises:

a first rotational force applied by the input drive shaft on the worm gear to rotate the worm gear; and a second rotational force applied by the worm gear on the jack screw to rotate the jack screw to longitudinally move the jack screw towards and away from the base.

11. The davit crane of claim 9, wherein the gear system of the drive assembly further comprises:

a first tapered roller bearing operably engaged with the worm gear and positioned between the worm gear and the top plate; and a second tapered roller bearing operably engaged with the worm gear and positioned between the worm gear and a fitting pipe of the drive assembly;

wherein the first tapered roller bearing is positioned vertically above the second tapered roller bearing inside of the housing.

12. The davit crane of claim 1, wherein the slew bearing further comprises:

a collar extending outwardly from the inner ring;

an upper raceway defined in the collar; and a lower raceway defined in the collar;

wherein the upper raceway and the lower raceway oppose one another relative to the collar.

13. The davit crane of claim 12, wherein the slew bearing further comprises:

a first lip extending outwardly from the first outer ring; and a first interior raceway defined in the first lip;

wherein the first interior raceway faces the upper raceway of the collar when the inner ring and the first outer ring are operably engaged with one another.

14. The davit crane of claim 13, wherein the slew bearing further comprises:

a second lip extending outwardly from the second outer ring; and a second interior raceway defined in the second lip; wherein the second interior raceway faces the lower raceway of the collar when the inner ring and the second outer ring are operably engaged with one another.

15. The davit crane of claim 14, wherein the slew bearing further comprises:

a first set of balls operably engaged with the upper raceway of the collar and the first interior raceway of the first lip when the inner ring and the first outer ring are operably engaged with one another; and a second set of balls operably engaged with the lower raceway of the collar and the second interior raceway of the second lip when the inner ring and the second outer ring are operably engaged with one another.

16. A method of lifting an object with a davit crane, comprising steps of:

engaging the object with a boom arm of a boom assembly of the davit crane;

applying a first rotational force on a gear system of a drive assembly of the davit crane;

applying a second rotational force, via the gear system, on an actuation assembly of the davit crane;

vertically moving the actuation assembly from a lowered position to a raised position relative to a base of the davit crane;

pivoting a first end of the boom arm of the boom assembly, via the actuation assembly, upwardly away from the base; and pivoting a second end of the boom arm of the boom assembly, via the actuation assembly, downwardly towards the base, wherein the second end of the boom arm opposes the first end of the boom arm.

17. The method of claim 16, wherein the step of vertically moving the actuation assembly from the lowered position to the raised position relative to the base of the davit crane includes longitudinally moving a jack screw of the actuation assembly downwardly into the base via the gear system.

18. The method of claim 16, further comprising:

rotating the boom assembly, via a slew bearing, about a longitudinal axis of the base relative to said base.

* * * * *